US012757212B2

(12) United States Patent
Zhang et al.

(10) Patent No.: US 12,757,212 B2
(45) Date of Patent: Oct. 6, 2026

(54) TECHNIQUES FOR SINGLE-DCI SWITCHING FOR DOWNLINK AND UPLINK BANDWIDTH PARTS AND SUB-BANDS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 17/958,190

(22) Filed: Sep. 30, 2022

(65) Prior Publication Data

US 2024/0107545 A1 Mar. 28, 2024

Related U.S. Application Data

(60) Provisional application No. 63/409,605, filed on Sep. 23, 2022.

(51) Int. Cl.
*H04W 72/23* (2023.01)
*H04L 5/14* (2006.01)

(52) U.S. Cl.
CPC ............... *H04W 72/23* (2023.01); *H04L 5/14* (2013.01)

(58) Field of Classification Search
CPC .... H04W 72/23; H04W 72/0453; H04L 5/14; H04L 5/001
See application file for complete search history.

(56) References Cited

U.S. PATENT DOCUMENTS

| | | | | |
|---|---|---|---|---|
| 12,058,772 B2 * | 8/2024 | Zhou | H04W 76/38 |
| 2022/0369421 A1 * | 11/2022 | Zhou | H04W 72/0453 |
| 2023/0104198 A1 * | 4/2023 | Maleki | H04L 5/0053 370/329 |
| 2023/0309105 A1 * | 9/2023 | Yi | H04W 72/0446 |
| 2023/0371046 A1 * | 11/2023 | Babaei | H04W 72/0457 |

(Continued)

FOREIGN PATENT DOCUMENTS

| | | |
|---|---|---|
| WO | WO-2021243287 A1 | 12/2021 |
| WO | WO-2022183422 A1 | 9/2022 |

OTHER PUBLICATIONS

International Search Report and Written Opinion—PCT/US2023/072734—ISA/EPO—Dec. 14, 2023 (2207393WO).

*Primary Examiner* — Hassan A Phillips
*Assistant Examiner* — Sang C Lee
(74) *Attorney, Agent, or Firm* — Holland & Hart LLP

(57) ABSTRACT

Methods, systems, and devices for wireless communications are described. A user equipment (UE) may be configured to receive, from a network node, control signaling indicating a first downlink bandwidth part (BWP) and a first uplink BWP, or a first downlink sub-band and a first uplink sub-band, or both, for performing sub-band full-duplex (SBFD) communications. The UE may receive, from the network node, a downlink control information (DCI) message indicating to switch to a second downlink BWP and a second uplink BWP, or to switch to a second downlink sub-band and a second uplink sub-band, or both. The UE may then perform full-duplex communications with the network node within the second downlink BWP and the second uplink BWP, or within the second downlink sub-band and the second uplink sub-band, or both.

26 Claims, 13 Drawing Sheets

(56) References Cited

U.S. PATENT DOCUMENTS

| | | | | |
|---|---|---|---|---|
| 2023/0388089 | A1* | 11/2023 | Kwak | H04L 27/2607 |
| 2024/0049069 | A1* | 2/2024 | Zhou | H04W 74/0833 |
| 2024/0073879 | A1* | 2/2024 | Park | H04W 72/0453 |
| 2024/0251408 | A1* | 7/2024 | Jung | H04W 72/23 |
| 2024/0259173 | A1* | 8/2024 | Kim | H04W 24/08 |

* cited by examiner

TECHNIQUES FOR SINGLE-DCI SWITCHING FOR DOWNLINK AND UPLINK BANDWIDTH PARTS AND SUB-BANDS

The present Application for patent claims the benefit of U.S. Provisional Patent Application No. 63/409,605 by ZHANG et al., entitled "TECHNIQUES FOR SINGLE-DCI SWITCHING FOR DOWNLINK AND UPLINK BANDWIDTH PARTS AND SUB-BANDS," filed Sep. 23, 2022, assigned to the assignee hereof, and expressly incorporated by reference herein.

FIELD OF TECHNOLOGY

The present disclosure relates to wireless communications, including techniques for single-downlink control information (DCI) switching for downlink and uplink bandwidth parts (BWPs) and sub-bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication systems, wireless devices may be able to simultaneously transmit and receive signals, which may be referred to as "full-duplex" communications. For example, in the context of sub-band full duplex (SBFD) communications, a UE may be able to transmit an uplink signal within an uplink sub-band or uplink bandwidth part (BWP), and simultaneously receive a downlink signal within a downlink sub-band or downlink BWP.

SUMMARY

The described techniques relate to improved methods, systems, devices, and apparatuses that support techniques for single-downlink control information (DCI) switching for downlink and uplink bandwidth parts (BWPs) and sub-bands. Generally, aspects of the present disclosure are directed to techniques for switching both downlink and uplink sub-bands and/or BWPs using a single DCI message. In other words, aspects of the present disclosure may support DCI formats that are able to indicate or switch both downlink and uplink BWPs/sub-bands. In particular, a single DCI message may be used to dynamically switch or indicate a downlink sub-band/BWP and an uplink sub-band/BWP for sub-band full-duplex (SBFD) communications. For example, a UE may be configured to perform SBFD communications within a first downlink sub-band (or first downlink BWP) and a first uplink sub-band (or a first uplink BWP). Subsequently, the UE may receive a single DCI message that switches both the downlink sub-band (or downlink BWP) and the uplink sub-band (or uplink BWP). In such cases, the UE may then communicate within the new downlink and uplink sub-bands/BWPs based on the indications in the DCI message.

A method is described. The method may include receiving, from a network entity, control signaling indicating a first downlink BWP and a first uplink BWP, or a first downlink sub-band and a first uplink sub-band, or both, for performing SBFD communications, receiving, from the network entity, a DCI message indicating to switch to a second downlink BWP and a second uplink BWP, or to switch to a second downlink sub-band and a second uplink sub-band, or both, and performing full-duplex communications with the network entity within the second downlink BWP and the second uplink BWP, or within the second downlink sub-band and the second uplink sub-band, or both.

An apparatus is described. The apparatus may include a processor, memory coupled with the processor, and instructions stored in the memory. The instructions may be executable by the processor to cause the apparatus to receive, from a network entity, control signaling indicating a first downlink BWP and a first uplink BWP, or a first downlink sub-band and a first uplink sub-band, or both, for performing SBFD communications, receive, from the network entity, a DCI message indicating to switch to a second downlink BWP and a second uplink BWP, or to switch to a second downlink sub-band and a second uplink sub-band, or both, and perform full-duplex communications with the network entity within the second downlink BWP and the second uplink BWP, or within the second downlink sub-band and the second uplink sub-band, or both.

Another apparatus is described. The apparatus may include means for receiving, from a network entity, control signaling indicating a first downlink BWP and a first uplink BWP, or a first downlink sub-band and a first uplink sub-band, or both, for performing SBFD communications, means for receiving, from the network entity, a DCI message indicating to switch to a second downlink BWP and a second uplink BWP, or to switch to a second downlink sub-band and a second uplink sub-band, or both, and means for performing full-duplex communications with the network entity within the second downlink BWP and the second uplink BWP, or within the second downlink sub-band and the second uplink sub-band, or both.

A non-transitory computer-readable medium storing code is described. The code may include instructions executable by a processor to receive, from a network entity, control signaling indicating a first downlink BWP and a first uplink BWP, or a first downlink sub-band and a first uplink sub-band, or both, for performing SBFD communications, receive, from the network entity, a DCI message indicating to switch to a second downlink BWP and a second uplink BWP, or to switch to a second downlink sub-band and a second uplink sub-band, or both, and perform full-duplex communications with the network entity within the second downlink BWP and the second uplink BWP, or within the second downlink sub-band and the second uplink sub-band, or both.

Some examples of the method, apparatuses, and non-transitory computer-readable medium described herein may further include operations, features, means, or instructions for receiving, via the DCI message, one or more BWP indicator field values indicating the second downlink BWP or the second uplink BWP and receiving, via the DCI message, one or more additional bit field values indicating an other of the second downlink BWP or the second uplink BWP, where the full-duplex communications may be performed within the second downlink BWP and the second uplink BWP based on the one or more BWP indicator field values and the one or more additional bit field values.

Some examples of the method, apparatuses, and non-transitory computer-readable medium described herein may further include operations, features, means, or instructions for determining that the one or more additional bit field values indicate the other of the second downlink BWP or the second uplink BWP based on the DCI message not scheduling data at the user equipment (UE).

In some examples of the method, apparatuses, and non-transitory computer-readable medium described herein, the one or more additional bit field values include a modulation and coding scheme (MCS) bit field, a time domain resource allocation (TDRA) bit field, or both.

Some examples of the method, apparatuses, and non-transitory computer-readable medium described herein may further include operations, features, means, or instructions for determining that one or more bit field values within the DCI message indicate the second downlink BWP and the second uplink BWP based on the DCI message not scheduling data at the UE.

Some examples of the method, apparatuses, and non-transitory computer-readable medium described herein may further include operations, features, means, or instructions for receiving, from the network entity, a radio resource control (RRC) message indicating a DCI format including one or more reserved bits used to switch downlink BWPs, uplink BWPs, or both, where the DCI message may be associated with the DCI format.

Some examples of the method, apparatuses, and non-transitory computer-readable medium described herein may further include operations, features, means, or instructions for receiving, from the network entity, an RRC message indicating a DCI format including one or more reserved bits used to switch downlink sub-bands, uplink sub-bands, or both, where the DCI message may be associated with the DCI format.

Some examples of the method, apparatuses, and non-transitory computer-readable medium described herein may further include operations, features, means, or instructions for receiving, via the DCI message, a first bit value of a BWP indicator field indicating the second downlink BWP and receiving, via the DCI message, a second bit value of the BWP indicator field indicating the second uplink BWP, where the full-duplex communications may be performed within the second downlink BWP and the second uplink BWP based on the first bit value and the second bit value of the BWP indicator field.

Some examples of the method, apparatuses, and non-transitory computer-readable medium described herein may further include operations, features, means, or instructions for receiving, via the DCI message, a first pair of bit values of a BWP indicator field indicating the second downlink BWP and receiving, via the DCI message, a second pair of bit values of the BWP indicator field indicating the second uplink BWP, where the full-duplex communications may be performed within the second downlink BWP and the second uplink BWP based on the first pair of bit values and the second pair of bit values of the BWP indicator field.

Some examples of the method, apparatuses, and non-transitory computer-readable medium described herein may further include operations, features, means, or instructions for receiving, via the DCI message, one or more bit values of a BWP indicator field indicating a downlink and uplink BWP pair or set identifier associated with the second downlink BWP and the second uplink BWP.

Some examples of the method, apparatuses, and non-transitory computer-readable medium described herein may further include operations, features, means, or instructions for receiving, from the network entity via the control signaling, additional control signaling, or both, an indication of a set of multiple downlink and uplink BWP pair or set identifiers, where each downlink and uplink BWP pair or set identifier may be associated with a respective downlink BWP and a respective uplink BWP, where the set of multiple downlink and uplink BWP pair or set identifiers include the downlink and uplink BWP pair or set identifier, and where receiving the DCI message may be based on receiving the indication of the set of multiple downlink and uplink BWP pair or set identifiers.

Some examples of the method, apparatuses, and non-transitory computer-readable medium described herein may further include operations, features, means, or instructions for receiving, from the network node, an RRC message indicating a DCI format including one or more bits of the BWP indicator field used to switch downlink and uplink BWP pair or set identifiers, where the DCI message may be associated with the DCI format.

Some examples of the method, apparatuses, and non-transitory computer-readable medium described herein may further include operations, features, means, or instructions for receiving, via the DCI message, a first pair of bit values of a BWP indicator field indicating a first downlink and uplink BWP pair or set identifier associated with the second downlink BWP and the second uplink BWP and receiving, via the DCI message, a second pair of bit values of the BWP indicator field indicating a second downlink and uplink BWP pair or set identifier associated with half-duplex communications at the UE.

In some examples of the method, apparatuses, and non-transitory computer-readable medium described herein, the DCI message includes a group-common DCI (GC-DCI) message.

Some examples of the method, apparatuses, and non-transitory computer-readable medium described herein may further include operations, features, means, or instructions for receiving, via the DCI message, an indication of respective starting and ending resource block indices associated with each of the second downlink sub-band and the second uplink sub-band, an indication of respective resource block set indices associated with each of the second downlink sub-band and the second uplink sub-band, or both.

Some examples of the method, apparatuses, and non-transitory computer-readable medium described herein may further include operations, features, means, or instructions for determining that one or more bit field values received via the DCI message indicate the second downlink sub-band and the second uplink sub-band based on the DCI message not scheduling data at the UE, where the one or more bit field values include an MCS bit field, a TDRA bit field, or both.

A method is described. The method may include transmitting, to a UE, control signaling indicating a first downlink BWP and a first uplink BWP, or a first downlink sub-band and a first uplink sub-band, or both, for performing SBFD communications, or both, transmitting, to the UE, a DCI message indicating to switch to a second downlink BWP and a second uplink BWP, or to switch to a second downlink sub-band and a second uplink sub-band, or both, and performing full-duplex communications with the UE within the second downlink BWP and the second uplink BWP, or within the second downlink sub-band and the second uplink sub-band, or both.

An apparatus is described. The apparatus may include a processor, memory coupled with the processor, and instructions stored in the memory. The instructions may be executable by the processor to cause the apparatus to transmit, to a UE, control signaling indicating a first downlink BWP and a first uplink BWP, or a first downlink sub-band and a first uplink sub-band, or both, for performing SBFD communications, or both, transmit, to the UE, a DCI message indicating to switch to a second downlink BWP and a second uplink BWP, or to switch to a second downlink sub-band and a second uplink sub-band, or both, and perform full-duplex communications with the UE within the second downlink BWP and the second uplink BWP, or within the second downlink sub-band and the second uplink sub-band, or both.

Another apparatus is described. The apparatus may include means for transmitting, to a UE, control signaling indicating a first downlink BWP and a first uplink BWP, or a first downlink sub-band and a first uplink sub-band, or both, for performing SBFD communications, or both, means for transmitting, to the UE, a DCI message indicating to switch to a second downlink BWP and a second uplink BWP, or to switch to a second downlink sub-band and a second uplink sub-band, or both, and means for performing full-duplex communications with the UE within the second downlink BWP and the second uplink BWP, or within the second downlink sub-band and the second uplink sub-band, or both.

A non-transitory computer-readable medium storing code is described. The code may include instructions executable by a processor to transmit, to a UE, control signaling indicating a first downlink BWP and a first uplink BWP, or a first downlink sub-band and a first uplink sub-band, or both, for performing SBFD communications, or both, transmit, to the UE, a DCI message indicating to switch to a second downlink BWP and a second uplink BWP, or to switch to a second downlink sub-band and a second uplink sub-band, or both, and perform full-duplex communications with the UE within the second downlink BWP and the second uplink BWP, or within the second downlink sub-band and the second uplink sub-band, or both.

Some examples of the method, apparatuses, and non-transitory computer-readable medium described herein may further include operations, features, means, or instructions for transmitting, via the DCI message, one or more BWP indicator field values indicating the second downlink BWP or the second uplink BWP and transmitting, via the DCI message, one or more additional bit field values indicating an other of the second downlink BWP or the second uplink BWP, where the full-duplex communications may be performed within the second downlink BWP and the second uplink BWP based on the one or more BWP indicator field values and the one or more additional bit field values.

Some examples of the method, apparatuses, and non-transitory computer-readable medium described herein may further include operations, features, means, or instructions for transmitting one or more additional bit field values via the DCI message, where the one or more additional bit field values indicate the other of the second downlink BWP or the second uplink BWP based on the DCI message not scheduling data at the UE.

In some examples of the method, apparatuses, and non-transitory computer-readable medium described herein, the one or more additional bit field values include an MCS bit field, a TDRA bit field, or both.

Some examples of the method, apparatuses, and non-transitory computer-readable medium described herein may further include operations, features, means, or instructions for transmitting one or more bit field values via the DCI message, where the one or more bit field values indicate the second downlink BWP and the second uplink BWP based on the DCI message not scheduling data at the UE.

Some examples of the method, apparatuses, and non-transitory computer-readable medium described herein may further include operations, features, means, or instructions for transmitting, to the UE, an RRC message indicating a DCI format including one or more bits used to switch downlink BWPs, downlink sub-bands, uplink BWPs, uplink sub-bands, or any combination thereof, where the DCI message may be associated with the DCI format.

Some examples of the method, apparatuses, and non-transitory computer-readable medium described herein may further include operations, features, means, or instructions for transmitting, via the DCI message, a first bit value of BWP indicator field indicating the second downlink BWP and transmitting, via the DCI message, a second bit value of the BWP indicator field indicating the second uplink BWP, where the full-duplex communications may be performed within the second downlink BWP and the second uplink BWP based on the first bit value and the second bit value of the BWP indicator field.

Some examples of the method, apparatuses, and non-transitory computer-readable medium described herein may further include operations, features, means, or instructions for transmitting, via the DCI message, a first pair of bit values of a BWP indicator field indicating the second downlink BWP and transmitting, via the DCI message, a second pair of bit values of the BWP indicator field indicating the second uplink BWP, where the full-duplex communications may be performed within the second downlink BWP and the second uplink BWP based on the first pair of bit values and the second pair of bit values of the BWP indicator field.

Some examples of the method, apparatuses, and non-transitory computer-readable medium described herein may further include operations, features, means, or instructions for transmitting, via the DCI message, one or more bit values of a BWP indicator field indicating a downlink and uplink BWP pair or set identifier associated with the second downlink BWP and the second uplink BWP.

Some examples of the method, apparatuses, and non-transitory computer-readable medium described herein may further include operations, features, means, or instructions for transmitting, from the UE via the control signaling, additional control signaling, or both, an indication of a set of multiple downlink and uplink BWP pair or set identifiers, where each downlink and uplink BWP pair or set identifier may be associated with a respective downlink BWP and a respective uplink BWP, where the set of multiple downlink and uplink BWP pair or set identifiers include the downlink and uplink BWP pair or set identifier, and where transmitting the DCI message may be based on transmitting the indication of the set of multiple downlink and uplink BWP pair or set identifiers.

In some examples of the method, apparatuses, and non-transitory computer-readable medium described herein, the DCI message includes a GC-DCI message.

Some examples of the method, apparatuses, and non-transitory computer-readable medium described herein may further include operations, features, means, or instructions for transmitting, via the DCI message, an indication of respective starting and ending resource block indices associated with each of the second downlink sub-band and the second uplink sub-band, an indication of respective resource block set indices associated with each of the second downlink sub-band and the second uplink sub-band, or both.

Some examples of the method, apparatuses, and non-transitory computer-readable medium described herein may further include operations, features, means, or instructions for transmitting one or more bit field values via the DCI message, where the one or more bit field values indicate the second downlink sub-band and the second uplink sub-band based on the DCI message not scheduling data at the UE, where the one or more bit field values include an MCS bit field, a TDRA bit field, or both.

DETAILED DESCRIPTION

Figure 1:
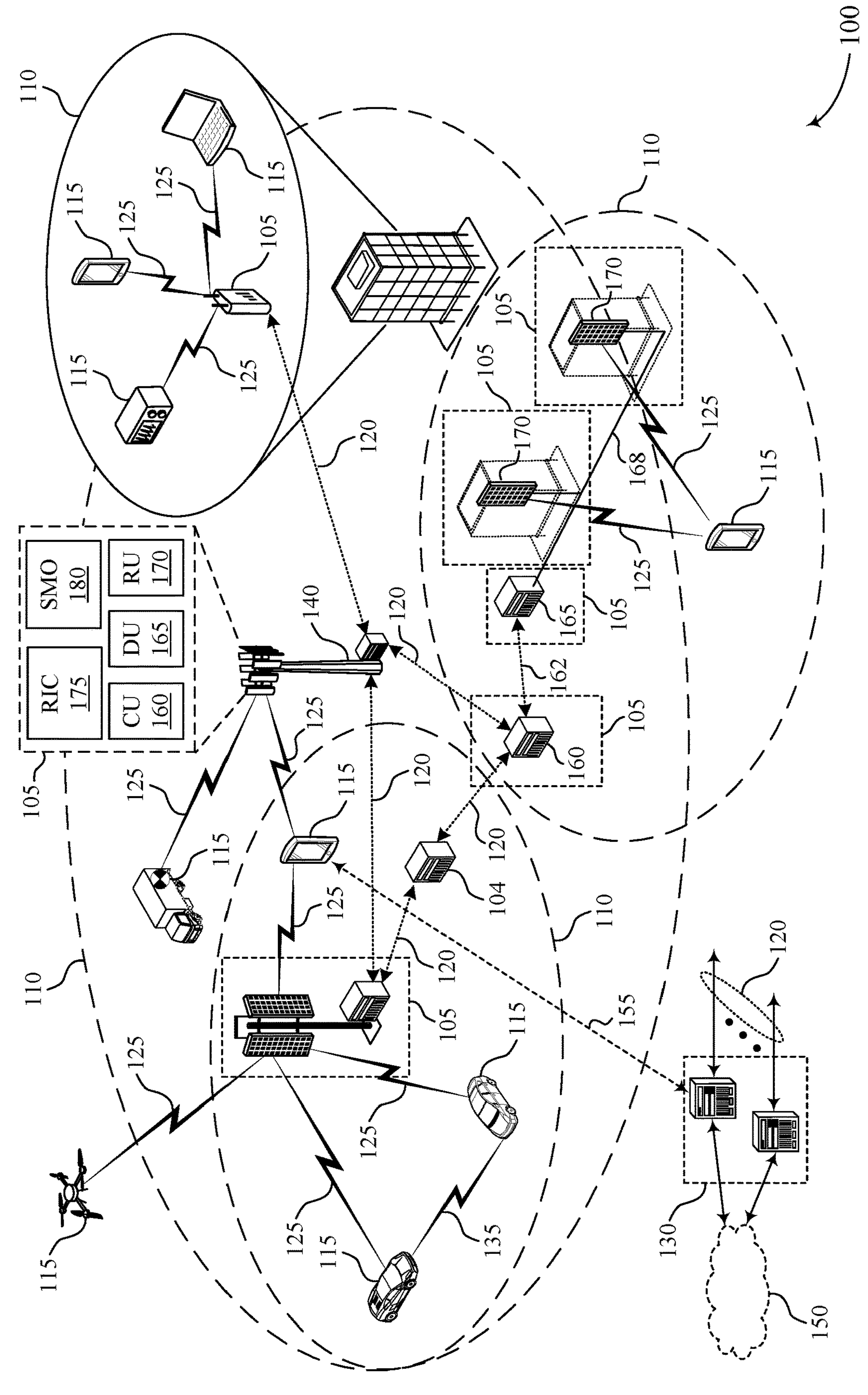
FIG. 1 illustrates an example of a wireless communications system that supports techniques for single-downlink control information (DCI) switching for downlink and uplink bandwidth parts (BWPs) and sub-bands in accordance with one or more aspects of the present disclosure.

In some wireless communication systems, wireless devices may be able to simultaneously transmit and receive signals, which may be referred to as "full-duplex" communications. For example, in the context of sub-band full duplex (SBFD) communications, a user equipment (UE) may be able to transmit an uplink signal within an uplink sub-band or uplink bandwidth part (BWP), and simultaneously receive a downlink signal within a downlink sub-band or downlink BWP. In such cases, the network may indicate which downlink sub-bands/BWPs and which uplink sub-bands/BWPs the UE is expected to use via separate control messages, such as downlink control information (DCI) messages. That is, a first DCI format (e.g., DCI format 1_1/1_2) may be used to indicate or switch downlink sub-bands/BWPs, and a second DCI format (e.g., DCI format 0_1/0_2) may be used to indicate or switch uplink sub-bands/BWPs. Such DCI messages may include "BWP indicator (ID)" fields used to indicate or switch the downlink or uplink BWPs.

However the use of separate DCI formats may result in increased signaling overhead and wasted resources. In particular, in order to switch a downlink BWP and an uplink BWP (or downlink/uplink sub-bands) that will be used by a UE for SBFD communications in the same slot, the network may be expected to transmit two separate DCI messages to switch the downlink and uplink BWPs, respectively. This results in increased signaling overhead, and may increase a latency with which UEs may perform BWP/sub-band switching for SBFD communications.

Accordingly, aspects of the present disclosure are directed to techniques for switching both downlink and uplink sub-bands/BWPs using a single DCI message. In other words, aspects of the present disclosure may support DCI formats that are able to indicate or switch both downlink and uplink BWPs/sub-bands. In particular, a single DCI message may be used to dynamically switch or indicate a downlink sub-band/BWP and an uplink sub-band/BWP for SBFD communications. For example, a UE may be configured to perform SBFD communications within a first downlink sub-band (or first downlink BWP) and a first uplink sub-band (or a first uplink BWP). Subsequently, the UE may receive a single DCI message that switches both the downlink sub-band (or downlink BWP) and the uplink sub-band (or uplink BWP). In such cases, the UE may then communicate within the new downlink and uplink sub-bands/BWPs based on the indications in the DCI message.

In some aspects, unused fields within DCI messages, such as modulation and coding scheme (MCS) or time domain resource allocation (TDRA) field, may be used in conjunction within BWP ID fields to switch both downlink and uplink sub-bands/BWPs. In other cases, DCI messages with reserved bits may be used to indicate/switch both downlink and uplink sub-bands/BWPs. In some aspects, the UE may be configured with pairs (or sets) of associated downlink and uplink BWPs (e.g., downlink/uplink BWP pair or set IDs), where the BWP ID bit fields may be used to switch downlink/uplink BWP pair or set IDs, and therefore switch both downlink and uplink BWPs at the UE.

Aspects of the disclosure are initially described in the context of wireless communications systems. Aspects of the disclosure are additionally described in the context of an example process flow. Aspects of the disclosure are further illustrated by and described with reference to apparatus diagrams, system diagrams, and flowcharts that relate to techniques for single-DCI switching for downlink and uplink BWPs and sub-bands.

FIG. 1 illustrates an example of a wireless communications system 100 that supports techniques for single-DCI switching for downlink and uplink BWPs and sub-bands in accordance with one or more aspects of the present disclosure. The wireless communications system 100 may include one or more network nodes 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network nodes 105 may be dispersed throughout a geographic area to form the wireless communications system 100 and may include devices in different forms or having different capabilities. In various examples, a network node 105 may be referred to as a network element, a mobility element, a radio access network (RAN) node, or network equipment, among other nomenclature. In some examples, network nodes 105 and UEs 115 may wirelessly communicate via one or more communication links 125 (e.g., a radio frequency (RF) access link). For example, a network node 105 may support a coverage area 110 (e.g., a geographic coverage area) over which the UEs 115 and the network node 105 may establish one or more communication links 125. The coverage area 110 may be an example of a geographic area over which a network node 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network nodes 105, as shown in FIG. 1.

As described herein, a node of the wireless communications system 100, which may be referred to as a network node, or a wireless node, may be a network node 105 (e.g., any network node described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network node 105. As another example, a first node may be configured to communicate with a second node or a third node. In one aspect of this example, the first node may be a UE 115, the second node may be a network node 105, and the third node may be a UE 115. In another aspect of this example, the first node may be a UE 115, the second node may be a network node 105, and the third node may be a network node 105. In yet other aspects of this example, the first, second, and third nodes may be different relative to these examples. Similarly, reference to a UE 115, network node 105, apparatus, device, computing system, or the like may include disclosure of the UE 115, network node 105, apparatus, device, computing system, or the like being a node. For example, disclosure that a UE 115 is configured to receive information from a network node 105 also discloses that a first node is configured to receive information from a second node.

In some examples, network nodes 105 may communicate with the core network 130, or with one another, or both. For example, network nodes 105 may communicate with the core network 130 via one or more backhaul communication links 120 (e.g., in accordance with an S1, N2, N3, or other interface protocol). In some examples, network nodes 105 may communicate with one another via a backhaul communication link 120 (e.g., in accordance with an X2, Xn, or other interface protocol) either directly (e.g., directly between network nodes 105) or indirectly (e.g., via a core network 130). In some examples, network nodes 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network nodes 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network node 105 (e.g., a base station 140) may be implemented in an aggregated (e.g., monolithic, standalone) base station architecture, which may be configured to utilize a protocol stack that is physically or logically integrated within a single network node 105 (e.g., a single RAN node, such as a base station 140).

In some examples, a network node 105 may be implemented in a disaggregated architecture (e.g., a disaggregated base station architecture, a disaggregated RAN architecture), which may be configured to utilize a protocol stack that is physically or logically distributed among two or more network nodes 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network node 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network nodes 105 in a disaggregated RAN architecture may be co-located, or one or more components of the network nodes 105 may be located in distributed locations (e.g., separate physical locations). In some examples, one or more network nodes 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)).

The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network nodes 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network nodes 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network node 105 (e.g., a donor base station 140). The one or more donor network nodes 105 (e.g., IAB donors) may be in communication with one or more additional network nodes 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for single-DCI switching for downlink and uplink BWPs and sub-bands as described herein. For example, some operations described as being performed by a UE 115 or a network node 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network nodes 105 and the network equipment including macro eNBs or gNBs, small cell eNBs or gNBs, or relay base stations, among other examples, as shown in FIG. 1.

The UEs 115 and the network nodes 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network node 105 and other devices may refer to communication between the devices and any portion (e.g., entity, sub-entity) of a network node 105. For example, the terms "transmitting," "receiving," or "communicating," when referring to a network node 105, may refer to any portion of a network node 105 (e.g., base station 140, a CU 160, a DU 165, a RU 170) of a RAN communicating with another device (e.g., directly or via one or more other network nodes 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network node 105 to a UE 115, uplink transmissions (e.g., return link transmissions) from a UE 115 to a network node 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network nodes 105, the UEs 115, or both) may have hardware configurations that support communications using a particular carrier bandwidth or may be configurable to support communications using one of a set of carrier bandwidths. In some examples, the wireless communications system 100 may include network nodes 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network nodes 105 or the UEs 115 may be expressed in multiples of a basic time unit which may, for example, refer to a sampling period of $T_s=1/(\Delta f_{max} \cdot N_f)$ seconds, for which $\Delta f_{max}$, may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots.

Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network node 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network node 105. In some other examples, the overlapping coverage areas 110 associated with different technologies may be supported by different network nodes 105. The wireless communications system 100 may include, for example, a heterogeneous network in which different types of the network nodes 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network node 105 (e.g., a base station 140, an RU 170), which may support aspects of such D2D communications being configured by (e.g., scheduled by) the network node 105. In some examples, one or more UEs 115 of such a group may be outside the coverage area 110 of a network node 105 or may be otherwise unable to or not configured to receive transmissions from a network node 105. In some examples, groups of the UEs 115 communicating via D2D communications may support a one-to-many (1:M) system in which each UE 115 transmits to each of the other UEs 115 in the group. In some examples, a network node 105 may facilitate the scheduling of resources for D2D communications. In some other examples, D2D communications may be carried out between the UEs 115 without an involvement of a network node 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network nodes 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network nodes 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network node 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network node 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network node 105 may be located at diverse geographic locations. A network node 105 may include an antenna array with a set of rows and columns of antenna ports that the network node 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network nodes 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network node 105 or a UE 115 may use beam sweeping techniques as part of beamforming operations. For example, a network node 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network node 105 multiple times along different directions. For example, the network node 105 may transmit a signal according to different beamforming weight sets associated with different directions of transmission. Transmissions along different beam directions may be used to identify (e.g., by a transmitting device, such as a network node 105, or by a receiving device, such as a UE 115) a beam direction for later transmission or reception by the network node 105.

Some signals, such as data signals associated with a particular receiving device, may be transmitted by transmitting device (e.g., a transmitting network node 105, a transmitting UE 115) along a single beam direction (e.g., a direction associated with the receiving device, such as a receiving network node 105 or a receiving UE 115). In some examples, the beam direction associated with transmissions along a single beam direction may be determined based on a signal that was transmitted along one or more beam directions. For example, a UE 115 may receive one or more of the signals transmitted by the network node 105 along different directions and may report to the network node 105 an indication of the signal that the UE 115 received with a highest signal quality or an otherwise acceptable signal quality.

In some examples, transmissions by a device (e.g., by a network node 105 or a UE 115) may be performed using multiple beam directions, and the device may use a combination of digital precoding or beamforming to generate a combined beam for transmission (e.g., from a network node 105 to a UE 115). The UE 115 may report feedback that indicates precoding weights for one or more beam directions, and the feedback may correspond to a configured set of beams across a system bandwidth or one or more subbands. The network node 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network node 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network node 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network node 105 or a core network 130 supporting radio bearers for user plane data. A PHY layer may map transport channels to physical channels.

The UEs 115 and the network nodes 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some aspects, the wireless communications system 100 may support techniques for switching both downlink and uplink sub-bands/BWPs using a single DCI message (e.g., single DCI format for switching both downlink and uplink sub-bands/BWPs). In particular, a single DCI message may be used to dynamically switch or indicate a downlink sub-band/BWP and an uplink sub-band/BWP for SBFD communications. For example, a UE 115 of the wireless communications system 100 may be configured to perform SBFD communications within a first downlink sub-band (or first downlink BWP) and a first uplink sub-band (or a first uplink BWP). Subsequently, the UE 115 may receive a single DCI message from a network node 105 that switches both the downlink sub-band (or downlink BWP) and the uplink sub-band (or uplink BWP). In such cases, the UE 115 may then communicate within the new downlink and uplink sub-bands/BWPs based on the indications in the DCI message.

In some aspects, unused fields within DCI messages (e.g., MCS fields, TDRA field) may be used in conjunction within BWP ID fields to switch both downlink and uplink sub-bands/BWPs. In other cases, DCI messages with reserved bits may be used to indicate/switch both downlink and uplink sub-bands/BWPs. In some aspects, the UE may be configured with pairs (or sets) of associated downlink and uplink BWPs (e.g., downlink/uplink BWP pair IDs, downlink/uplink BWP set IDs), where the BWP ID bit fields may be used to switch downlink/uplink BWP pair or set IDs, and therefore switch both downlink and uplink BWPs at the UE.

Techniques described herein may enable both downlink BWPs and uplink BWPs (or downlink sub-bands and uplink sub-bands) to be dynamically switched using a single DCI message. In this regard, techniques described herein may reduce control signaling and network overhead associated with performing BWP or sub-band switching at wireless devices. By enabling both downlink and uplink BWPs/sub-bands to be dynamically switched via a single DCI message, techniques described herein may reduce a latency with which UEs 115 may perform BWP/sub-band switching for SBFD communications. Moreover, by reducing the signaling required to perform both downlink and uplink BWP/sub-band switching, techniques described herein may reduce power consumption at the UEs 115, thereby resulting in improved performance and battery life.

Figure 2:
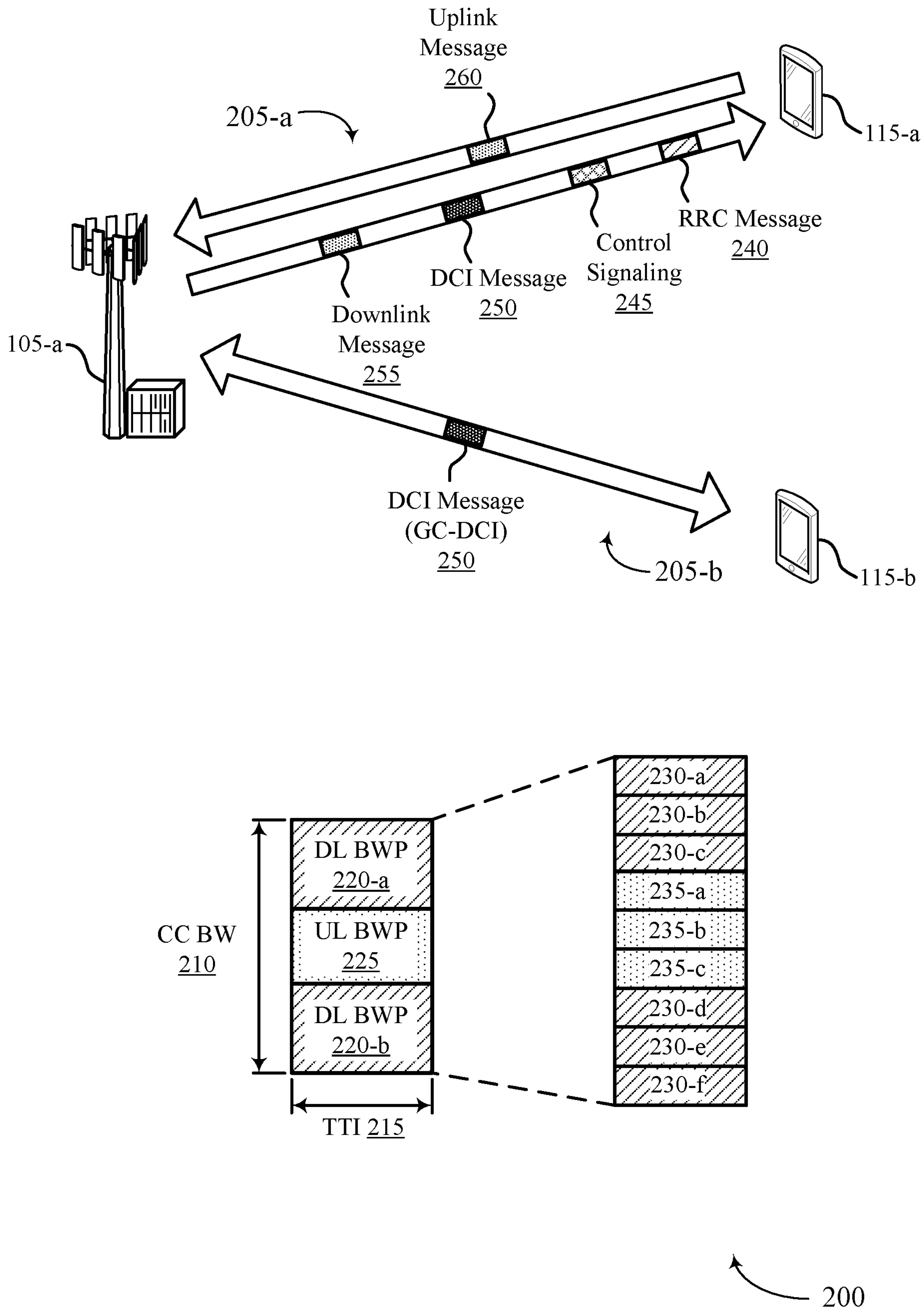
FIG. 2 illustrates an example of a wireless communications system that supports techniques for single-DCI switching for downlink and uplink BWPs and sub-bands in accordance with one or more aspects of the present disclosure.

FIG. 2 illustrates an example of a wireless communications system 200 that supports techniques for single-DCI switching for downlink and uplink BWPs and sub-bands in accordance with one or more aspects of the present disclosure. In some examples, the wireless communications system 200 may implement aspects of the wireless communications system 100. For example, the wireless communications system 200 may support signaling and configurations that enable downlink and uplink sub-bands/BWPs to be dynamically switched with a single DCI message or format, as described with reference to FIG. 1.

The wireless communications system 200 may include a first UE 115-*a*, a second UE 115-*b*, and a network node 105-*a*. The UE 115-*a* and UE 115-*b* may communicate with the network node 105-*a* using communication links 205-*a* and 205-*b*, respectively. For example, the first UE 115-*a* may communicate with the network node 105-*a* via a communication link 205-*a*, where the communication link 205-*a* may include an example of an access link (e.g., Uu link). The communication links 205 may include a bi-directional link that can include both uplink and downlink communication. For example, the first UE 115-*a* may transmit uplink transmissions, such as uplink control signals or uplink data signals, to the network node 105-*a* via communication link 205-*a*, and the network node 105-*a* may transmit downlink transmissions, such as downlink control signals or downlink data signals, to the first UE 115-*a* via the communication link 205-*a*.

As noted previously herein, some wireless communications systems and devices may support half-duplex communications, in which a respective wireless device is able to transmit or receive in one direction at a time. Additionally, some wireless communications systems and devices may support full-duplex communications, in which the wireless devices are be able to simultaneously transmit and receive signals.

For example, in the context of full-duplex communications, the network node 105-*a* may be configured to transmit downlink signals to the first UE 115-*a*, and may simultaneously (e.g., within the same slot or TTI 215) receive uplink communications from the second UE 115-*b*. In such cases, the downlink and uplink communications may be performed via separate antenna panels at the network node 105-*a* (e.g., Tx antenna panel for transmitting downlink signals, Rx antenna panel for receiving uplink signals).

Due to the simultaneous transmission and reception of signals, full-duplex communications may be susceptible to different types of interference, such as self-interference and clutter echo. For example, continuing with reference to full-duplex communications in the context of the network node 105-*a*, self-interference may occur when signals transmitted by the Tx antenna panel of the network node 105-*a* are received by the Rx antenna panel at the network node 105-*a*. Similarly, clutter echo may occur when downlink signals transmitted by the Tx antenna panel are reflected by some object or material back to the Rx antenna panel, thereby interfering with other communications received at the Rx antenna panel.

Some wireless communications may support SBFD communications, in which a wireless device performs simultaneous transmission and reception of communications (e.g., uplink and downlink communications, uplink and sidelink communications, etc.) on a sub-band basis. For example, as shown in FIG. 2, a component carrier bandwidth 210 may span a set of resources in the time domain (e.g., TTI 215), and may span a set of BWPs in the frequency domain. For instance, the bandwidth 210 may include a first downlink BWP 220-*a*, an uplink BWP 225, and a second downlink BWP 220-*b*. The bandwidth 210 may include any number of downlink BWPs 220 and uplink BWPs 225, where each respective BWP includes one or more sub-bands. For example, the first downlink BWP 220-*a* may include downlink sub-bands 230-*a*, 230-*b*, and 230-*c*, and the second downlink BWP 220-*b* may include downlink sub-bands 230-*d*, 230-*e*, and 230-*f*. Similarly, the uplink BWP 225 may include uplink sub-bands 235-*a*, 235-*b*, and 235-*c*.

In the context of SBFD communications the first UE 115-*a* (or another wireless device) may be configured to perform overlapping (e.g., simultaneous) uplink and downlink communications within different sub-bands. For example, the first UE 115-*a* may receive a downlink signal within downlink sub-band 230-*a*, and may transmit an uplink signal within uplink sub-band 235-*c*, where the downlink and uplink signals at least partially overlap in time.

In some cases, SBFD communications may result in more efficient use of resources, and may reduce a latency with which downlink and uplink communications may be performed. Moreover, SBFD communications may increase an uplink duty cycle, which may lead to latency reduction (e.g., SBFD enables the first UE 115-*a* to receive downlink signals in what may have otherwise been an uplink-only slot, leading to latency savings). Further, SBFD communications may enable uplink coverage improvement, enhance system capacity, resource utilization, and spectrum efficiency, and may enable flexible and dynamic uplink and downlink resource adaption according to uplink and downlink traffic in a robust manner.

However, in some conventional wireless communications systems, the network may indicate which downlink BWPs 220 or downlink sub-bands 230, and which uplink BWPs 225 or uplink sub-bands 235, that the UEs 115 are expected to use for SBFD communications via separate control messages, such as DCI messages. That is, a first DCI format (e.g., DCI format 1_1/1_2) may be used to indicate or switch downlink sub-bands/BWPs, and a second DCI format (e.g., DCI format 0_1/0_2) may be used to indicate or switch uplink sub-bands/BWPs. Such DCI messages may include BWP ID fields used to indicate or switch the downlink or uplink BWPs.

For example, DCI formats 1_1/1_2 may include BWP ID fields that indicate or switch downlink BWPs 220 at the UEs 115. Similarly, DCI formats 0_1/0_2 may include BWP ID fields that indicate or switch uplink BWPs 225 at the UEs 115. In this regard, according to some conventional solutions, if the network node 105-*a* is to switch which downlink BWPs 220 and uplink BWPs 225 the UE 115-*a* is expected to use, the network node 105-*a* may be required to transmit two separate DCI messages. This may result in increased signaling overhead within the wireless communications system 200.

Accordingly, the wireless communications system 200 may support techniques for switching both downlink BWPs 220 and uplink BWPs 225 (and/or downlink sub-bands 230 and uplink sub-bands 235) using a single DCI message or format. In other words, aspects of the present disclosure may support DCI formats that are able to indicate or switch both downlink and uplink BWPs/sub-bands. In particular, a single DCI message may be used to dynamically switch or indicate a downlink sub-band/BWP and an uplink sub-band/BWP for SBFD communications. The ability to switch downlink BWPs 220 and uplink BWPs 225 (and/or downlink sub-bands 230 and uplink sub-bands 235) may be particularly useful in the context of SBFD communications, as SBFD communications enable different downlink and uplink frequency resources/sub-bands to be used simultaneously within the same TTI 215 (e.g., slot, symbol).

For example, as shown in FIG. 2, the UE 115-*a* may receive, from the network node 105-*a*, an RRC message 240 that indicates one or more DCI formats that may be used to switch both downlink BWPs 220 and uplink BWPs 225, switch both downlink sub-bands 230 and uplink sub-bands 235, or both. For example, the RRC message 240 may indicate DCI formats that include one or more bit fields that may be used to switch both a downlink BWP 220 and an uplink BWP 225 at the UE 115-*a*.

In some aspects, the RRC message 240 may indicate other information associated with full-duplex communications (e.g., SBFD communications) at the UE 115-*a*. For example, in some cases, the RRC message 240 may indicate a set of downlink/uplink BWP pair IDs (and/or downlink/uplink BWP set IDs), where each BWP pair/set ID includes or is associated with a downlink BWP 220 and an uplink BWP 225. For example, a first BWP pair ID may include downlink BWP #1 and uplink BWP #1, and a second BWP pair ID may include downlink BWP #3 and uplink BWP #4. The use of BWP pair IDs may enable subsequent DCI messages 250 to switch both downlink BWPs 220 and uplink BWPs 225 at the UE 115-*a* by indicating a new BWP pair ID.

The UE 115-*a* may receive control signaling 245 which indicates downlink and uplink BWPs and/or downlink and uplink sub-bands for SBFD communications at the UE 115-*a*. For example, in some cases, the control signaling 245 (e.g., RRC signaling, DCI signaling, MAC-CE signaling, SIB signaling, etc.) may indicate the first downlink BWP 200-*a* and the first uplink BWP 225 for SBFD communications at the UE 115-*a*. In other words, the control signaling 245 may indicate that the UE 115-*a* is to perform communications (e.g., SBFD communications) within the first downlink BWP 220-*a* and the uplink BWP 225. By way of another example, in other cases, the control signaling 245 may indicate the first downlink sub-band 230-*a* and the first uplink sub-band 235-*a* for SBFD communications at the UE 115-*a*.

In some implementations, the network node 105-*a* may transmit the RRC message 240, the control signaling 245, or both, based on an indication that the UE 115-*a* is able to perform full-duplex communications (e.g., based on capability signaling from the UE 115-*a*). In some cases, the UE 115-*a* may receive the control signaling 245 based on receiving the RRC message 240. Additionally, or alternatively, the RRC message 240 and the control signaling 245 may include the same message/signaling. In other words, in some cases, the information described herein as being indicated via the RRC message 240 may additionally or alternatively be indicated via the control signaling 245, and vice versa.

In some aspects, the UE 115-*a* may receive, from the network node 105-*a*, a DCI message 250 indicating for the UE 115-*a* to switch the downlink BWP 220 and the uplink BWP 225, and/or to switch the downlink sub-band 230 and the uplink sub-band 235. For example, the DCI message 250 may indicate for the UE 115-*a* to switch to the second downlink BWP 220-*b* and to a second uplink BWP 225. Additionally, or alternatively, the DCI message 250 may indicate for the UE 115-*a* to switch to a second downlink sub-band 230 (e.g., downlink sub-band 230-*b*, 230-*c*) and a second uplink sub-band 235 (e.g., uplink sub-band 235-*b*, 235-*c*).

The DCI message 250 may indicate that both downlink and uplink BWPs/sub-bands are to be switched via multiple different implementations or methodologies. Different implementations for switching both downlink and uplink BWPs/sub-bands may include, but are not limited to, utilizing unused bits, utilizing reserved bits, re-interpreting BWP indicator bit fields, switching BWP pair IDs, utilizing GC-DCI messages 250, and the like.

For example, in some cases, downlink BWPs 220 and uplink BWPs 225 may be associated with separate configured BWP IDs (e.g., downlink BWP #N, uplink BWP #M, where N may be equal or not equal to M). In such cases, the DCI message 250 may indicate the switch for downlink/uplink BWPs/sub-bands via unused bits, BWP indicator bit fields, dedicated/reserved bits, or any combination thereof. For instance, the DCI message 250 may be associated with a DCI format that does not schedule data communications at the UE 115-*a*. In such cases, unused bits within the DCI message 250 may be used to switch the downlink BWP 220 and the uplink BWP 225 (and/or downlink sub-band 230 and uplink sub-band 235) at the UE 115-*a*.

By way of example, the DCI message 250 may include bit field values of all "0"s or all "1"s indicating that the DCI message 250 does not schedule uplink and/or downlink data at the UE 115-*a* (e.g., FDRA fields with all "0"s or all "1"s). In this example, additional fields (e.g., MCS field(s), time domain resource allocation (TDRA) fields) can be used to indicate a switched uplink BWP 225 ID (and/or switched uplink sub-band 235), and BWP indicator fields may be used to indicate a switched downlink BWP 220 ID (and/or switched downlink sub-band 230), or vice versa. By way of another example, in cases where the DCI message 250 does not schedule data at the UE 115-*a* (e.g., FDRA fields with all "0"s or all "1"s), then MCS fields, TDRA fields, and the like, may be used to indicate both the switched downlink BWP 220 and uplink BWP 225 (and/or to indicate the switched downlink sub-band 230 and uplink sub-band 235).

In such cases, the UE 115-*a* may be configured to determine that the additional bit field values within the DCI message 250 (e.g., MCS, TDRA) are used to switch the downlink BWP 220 and uplink BWP 225 (and/or downlink sub-band 230 and uplink sub-band 235) based on determining that the DCI message 250 does not schedule any data communications at the UE 115-*a*. In other words, the UE 115-*a* may be configured to re-interpret the additional bit field values (e.g., MCS, TDRA) if the DCI message 250 does not schedule data communications at the UE 115-*a* (e.g., based on determining that the DCI message 250 includes FDRA fields with all "0"s or all "1"s.

By way of another example, the DCI message 250 may switch both downlink and uplink BWPs/sub-bands by reusing a DCI format that has reserved bits, where the DCI message 250 may or may not schedule other communications at the UE 115-*a*. For example, the RRC message 240 may configure a few reserved bits in a downlink DCI format that may be used to indicate a switched uplink BWP 225 ID, together with the BWP indicator field(s) that may be used to indicate a switched downlink BWP 220 ID. Conversely, the RRC message 240 may indicate a DCI format that includes reserved bits for switching the downlink BWP 220, where the uplink BWP 225 may be switched using the BWP indicator field(s). Additionally, or alternatively, the RRC message 240 may indicate or configure one or more DCI formats which include reserved bits for indicating/switching both downlink BWPs 220 and uplink BWPs 225 (e.g., reserved fields for indicating both switched downlink and uplink BWP IDs), and/or for switching both downlink sub-bands 230 and uplink sub-bands 235.

In some implementations, the BWP indicator fields within the DCI message 250 may be reused (or re-interpreted) to switch both downlink and uplink BWPs (and/or downlink and uplink sub-bands) at the UE 115-*a*. For example, in some cases, the BWP indicator field(s) within the DCI message 250 may be reused or reinterpreted with different meanings. For instance, in some cases, two bits of the BWP indicator field may be used to indicate both the new downlink BWP 220 ID and the new uplink BWP 225 ID. In this example, one bit of the BWP indicator field may be used to indicate the BWP ID associated with the new/switched downlink BWP 220, and one bit of the BWP indicator field may be used to indicate the BWP ID associated with the new/switched uplink BWP 225. In such cases, there may be up to two configured downlink BWPs 220 and two configured uplink BWPs 225 (each with 1 bit).

Additionally, or alternatively, if there are to be more than two configured downlink BWPs 220 and two configured uplink BWPs 225, two bits of the BWP indicator field may be used to indicate the BWP ID associated with the new/switched downlink BWP 220, and two bits of the BWP indicator field may be used to indicate the BWP ID associated with the new/switched uplink BWP 225.

In cases where the DCI message 250 switches the downlink sub-band 230 and the uplink sub-band 235 (e.g., via unused bit fields (MCS, TDRA), via BWP indicator fields, via reserved bits, or any combination thereof), the new downlink and uplink sub-bands may be indicated via a starting resource block index and an ending resource block index/allocation bandwidth per sub-band, a preconfigured resource block set index per sub-band, or both. For example, the DCI message 250 may indicate respective starting and ending resource block indices associated with the second downlink sub-band 230 and the second uplink sub-band 235 in order to signal the switch to the second downlink/uplink sub-bands. By way of another example, the DCI message 250 may indicate respective resource block set indices associated with the second downlink sub-band 230 and the second uplink sub-band 235 in order to signal the switch to the second downlink/uplink sub-bands.

In other cases, the DCI message 250 may switch both the downlink and uplink BWPs (and/or downlink and uplink sub-bands) at the UE 115-*a* by indicating or activating a new BWP pair ID. In other words, a downlink BWP 220 and an uplink BWP 225 may be associated with a single configured BWP ID for SBFD operation, which may be referred to as a BWP pair ID. In such cases, each BWP pair ID is associated with a downlink BWP 220 (e.g., downlink BWP ID) and an uplink BWP 225 (e.g., uplink BWP ID), where the DCI message 250 may be configured to switch both downlink BWPs 220 and uplink BWPs 225 by indicating a new BWP pair ID.

The IDs for the downlink BWP 220 and uplink BWP 225 within each receptive BWP pair ID may be the same or different (e.g., BWP Pair ID #1={DL BWP ID #1, UL BWP ID #1}; BWP Pair ID #2={DL BWP ID #3, UL BWP ID #4}). If the UE 115-*a* and/or the network is limited to up to four BWP IDs, then two pairs may be used for SBFD BWPs, and two pairs may be used for half-duplex BWPs.

For example, BWP indicator field within the DCI message 250 (e.g., uplink or downlink DCI message 250) may be used to indicate the new configured BWP pair ID including BWP IDs associated with the second downlink BWP 220 and the second uplink BWP 225. In this example, the DCI message 250 may indicate a pair of BWPs (e.g., downlink and uplink BWPs) switched for SBFD or half-duplex operation, where the RRC message 240 and/or control signaling 245 may indicate (e.g., preconfigure) the meaning of the BWP indicator field applicable for SBFD and/or half-duplex operation for the DCI message 250. Stated differently, the control signaling 245 may activate a first BWP pair ID associated with the first uplink BWP 225 and the first downlink BWP 220-*a*, and the DCI message 250 may indicate or activate a second BWP pair ID associated with a second uplink BWP 225 and a second downlink BWP 220 (e.g., downlink BWP 220-*b*).

By way of another example, if the UE 115-*a* is to be configured with more than two pairs of BWPs for SBFD communications and two pairs of BWPs for half-duplex communications, the DCI message 250 may include one or more additional bits of the BWP indicator field (e.g., five or more BWP indicator field bits) that may be used to indicate whether the BWP pair ID field is for half-duplex BWP pairs or for SBFD BWP pairs. In this regard, the network may be able to configure up to four pairs of BWP pair IDs for both half-duplex and SBFD communications. Moreover, in such cases, the DCI format with additional BWP indicator field bits may be indicated/configured via the RRC message 240.

In some implementations, the network node 105-*a* may utilize a GC-DCI format (e.g., DCI format 2_x) for the DCI message 250 that switches both the downlink BWP 220 and the uplink BWP 225 (and/or both downlink and uplink sub-bands) for multiple UEs 115 including the UE 115-*a*. In such cases, the GC-DCI message 250 may indicate the switch for downlink and uplink BWPs/sub-bands via separate downlink BWP 220 and uplink BWP 220 IDs (and/or sub-band IDs), or via configured BWP pair IDs, as described herein. Moreover, in such cases, the network node 105-*a* may transmit the GC-DCI message 250 to a group of UEs 115 that are associated with the same downlink/uplink BWP configuration (and/or same downlink/uplink sub-band configuration) for SBFD operation.

For example, as shown in FIG. 2, the network node 105-*a* may transmit a GC-DCI message 250 to the first UE 115-*a* and the second UE 115-*b*, where the GC-DCI message 250 switches the downlink BWP 220 and uplink BWP 225 (and/or downlink sub-band 230 and uplink sub-band 235) at both the first UE 115-*a* and the second UE 115-*b*. In this example, the first UE 115-*a* and the second UE 115-*b* may have the same downlink/uplink sub-band configuration for SBFD operation.

Subsequently, the UE 115-*a* may be configured to perform full-duplex communications within the second downlink BWP 220 and the second uplink BWP 225 (and/or within the second downlink sub-band 230 and the second uplink sub-band 235). The UE 115-*a* may perform the full-duplex communications at 325 based on receiving the RRC message 240, receiving the control signaling 245, receiving the DCI message 250 indicating the switch, switching to the new downlink and uplink BWPs/sub-bands, or any combination thereof. The full-duplex communications performed by the UE 115-*a* at 325 may be performed with the same or different wireless devices, such as the network node 105-*a*, an additional network node 105, another UE 115, and the like.

For example, as shown in FIG. 2, the UE 115-*a* may receive a downlink message 255 from the network node 105-*a* within the second downlink BWP 220 and/or second downlink sub-band 230, and may transmit an uplink message 260 to the network node 105-*a* within the second uplink BWP 225 and/or second uplink sub-band 235.

Techniques described herein may enable both downlink BWPs 220 and uplink BWPs 225 (or downlink sub-bands 230 and uplink sub-bands 235) to be dynamically switched using a single DCI message 250. In this regard, techniques described herein may reduce control signaling 245 and network overhead associated with performing BWP or sub-band switching at wireless devices. By enabling both downlink and uplink BWPs/sub-bands to be dynamically switched via a single DCI message 250, techniques described herein may reduce a latency with which the UE 115-*a* may perform BWP/sub-band switching for SBFD communications. Moreover, by reducing the signaling required to perform both downlink and uplink BWP/sub-band switching, techniques described herein may reduce power consumption at the UE 115-*a*, thereby resulting in improved performance and battery life.

Figure 3:
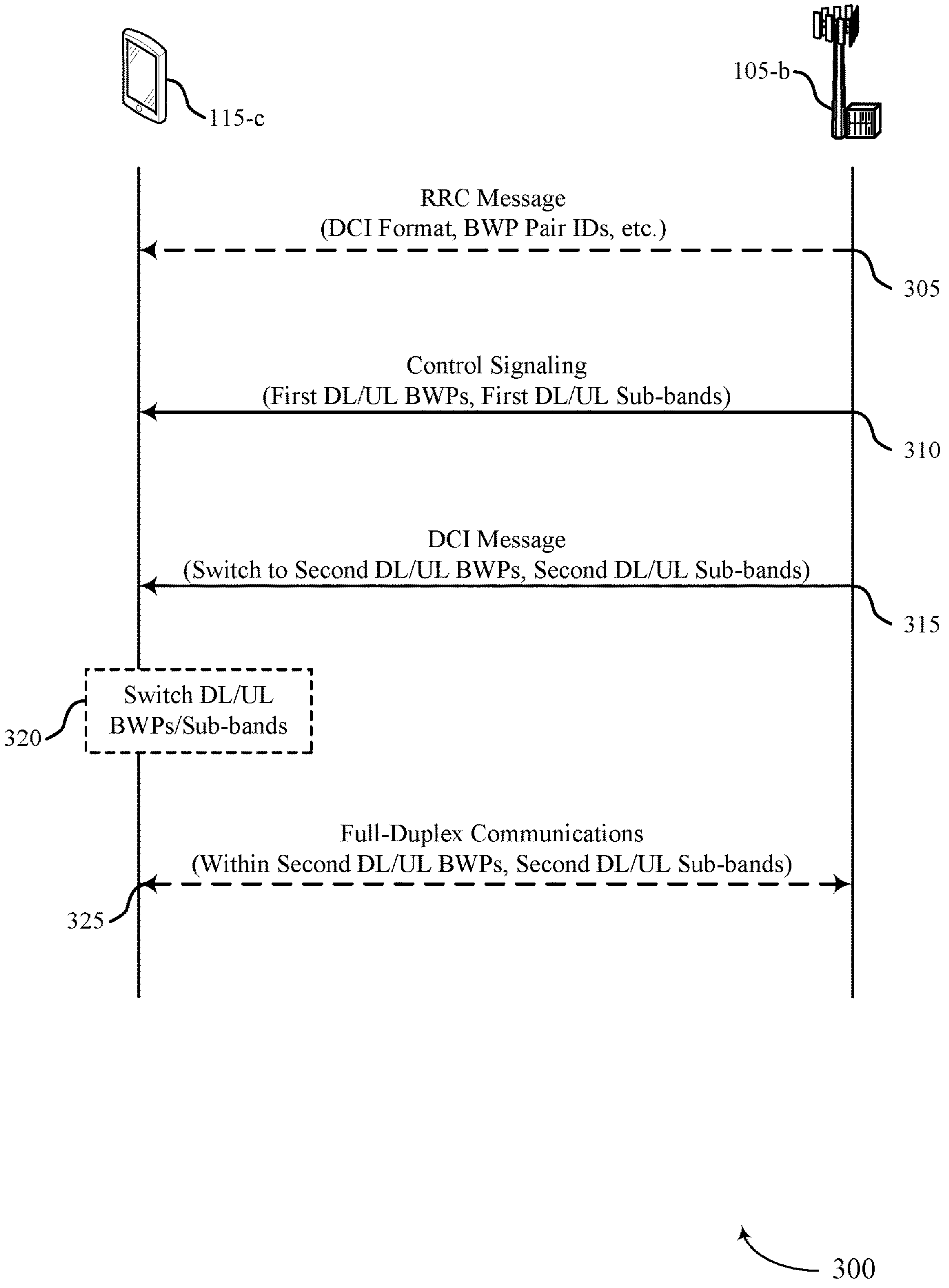
FIG. 3 illustrates an example of a process flow that supports techniques for single-DCI switching for downlink and uplink BWPs and sub-bands in accordance with one or more aspects of the present disclosure.

FIG. 3 illustrates an example of a process flow 300 that supports techniques for single-DCI switching for downlink and uplink BWPs and sub-bands in accordance with one or more aspects of the present disclosure. In some examples, the process flow 300 may implement, or be implemented by, aspects of wireless communications systems 100, the wireless communications system 200, or both. For example, process flow 300 illustrates signaling and configurations that enable a single DCI message/format to switch both downlink and uplink BWPs/sub-bands, as described with reference to FIGS. 1-2.

In some cases, process flow 300 may include a UE 115-*c* and a network node 105-*b*, which may be examples of corresponding devices as described herein. For example, the UE 115-*c* and the network node 105-*b* illustrated in FIG. 3 may include examples of the UE 115-*a* and the network node 105-*b*, respectively, as illustrated in FIG. 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-*c* may receive, from the network node 105-*b*, an RRC message that indicates one or more DCI formats that may be used to switch both downlink and uplink BWPs, switch both downlink and uplink sub-bands, or both. For example, the RRC message may indicate DCI formats that include one or more bit fields that may be used to switch both a downlink BWP and an uplink BWP at the UE 115-*c*.

In some aspects, the RRC message may indicate other information associated with full-duplex communications (e.g., SBFD communications) at the UE 115-*c*. For example, in some cases, the RRC message may indicate a set of BWP pair IDs, where each BWP pair ID includes or is associated with a downlink BWP and an uplink BWP. For example, a first BWP pair ID may include downlink BWP #1 and uplink BWP #1, and a second BWP pair ID may include downlink BWP #3 and uplink BWP #4. As described previously herein, BWP pair IDs may enable subsequent DCI messages to switch both downlink and uplink BWPs at the UE 115-*c* by indicating a new BWP pair ID.

At 310, the UE 115-*c* may receive control signaling which indicates downlink and uplink BWPs and/or downlink and uplink sub-bands for SBFD communications at the UE 115-*c*. In some implementations, the network node 105-*b* may transmit the RRC message at 305, the control signaling at 310, or both, based on an indication that the UE 115-*c* is able to perform full-duplex communications (e.g., based on capability signaling from the UE 115-*c*). In other words, the network node 105-*b* may activate respective downlink and uplink BWPs/sub-bands that will be used for full-duplex communications at the UE 115-*c*.

For example, in some cases, the control signaling (e.g., RRC signaling, DCI signaling, MAC-CE signaling, SIB signaling, etc.) may indicate a first downlink BWP and a first uplink BWP for SBFD communications at the UE 115-*c*. By way of another example, in other cases, the control signaling may indicate a first downlink sub-band and a first uplink sub-band for SBFD communications at the UE 115-*c*.

In some cases, the UE 115-*c* may receive the control signaling at 310 based on receiving the RRC message at 305. Additionally, or alternatively, the RRC message at 305 and the control signaling at 310 may include the same message/signaling. In other words, in some cases, the information described herein as being indicated via the RRC message at 305 may additionally or alternatively be indicated via the control signaling at 310. Conversely, in some cases, the information described herein as being indicated via the control signaling at 310 may additionally or alternatively be indicated via the RRC message at 305.

At 315, the UE 115-*c* may receive, from the network node 105-*b*, a DCI message indicating for the UE 115-*c* to switch downlink and uplink BWPs and/or sub-bands. For example, the DCI message may indicate for the UE 115-*c* to switch to a second downlink BWP and a second uplink BWP. Additionally, or alternatively, the DCI message may indicate for the UE 115-*c* to switch to a second downlink sub-band and a second uplink sub-band.

The UE 115-*c* may receive the DCI message at 315 based on receiving the RRC message at 305, receiving the control signaling at 310, or both. For example, the DCI message may exhibit a DCI format that is capable of switching both downlink and uplink BWPs and/or both downlink and uplink sub-bands, where the DCI format was previously indicated via the RRC message at 305, the control signaling at 310, or both.

As noted previously herein, the DCI message may indicate that both downlink and uplink BWPs/sub-bands are to be switched via multiple different implementations or methodologies. Different implementations for switching both downlink and uplink BWPs/sub-bands may include, but are not limited to, utilizing unused bits, utilizing reserved bits, re-interpreting BWP indicator bit fields, switching BWP pair IDs, utilizing GC-DCI messages, and the like.

For example, as described previously herein, the DCI message may not schedule data at the UE 115-*c* and may utilize unused bit fields to switch both downlink and uplink BWPs/sub-bands. Other (unused) fields that may be used to switch downlink and uplink BWPs/sub-bands may include, but are not limited to, MCS fields, TDRA fields, and the like.

For instance, the DCI message may switch the downlink BWP (or downlink sub-band) using bit values of a BWP indicator field within the DCI message, and may utilize one or more additional bit field values (e.g., MCS bit fields, TDRA bit fields) to switch the uplink BWP (or uplink sub-band). Conversely, the DCI message may switch the uplink BWP (or uplink sub-band) using bit values of a BWP indicator field within the DCI message, and may utilize one or more additional bit field values (e.g., MCS bit fields, TDRA bit fields) to switch the downlink BWP (or downlink sub-band). Additionally, or alternatively, additional bit field values (e.g., MCS, TDRA) may be used to indicate/switch both the uplink and downlink BWPs/sub-bands (e.g., without a separate indication within the BWP indicator field(s)).

In such cases, the UE 115-*c* may be configured to determine that the additional bit field values (e.g., MCS, TDRA) are used to switch the downlink and/or uplink BWP/sub-band based on determining that the DCI message does not schedule any data communications at the UE 115-*c*. In other words, the UE 115-*c* may be configured to re-interpret the additional bit field values (e.g., MCS, TDRA) if the DCI message does not schedule data communications at the UE 115-*c*.

In some cases, as described previously herein, the RRC message and/or the control signaling may indicate a DCI format that includes reserved bits that may be used to switch downlink and/or uplink BWPs/sub-bands. In such cases, the DCI message may exhibit the DCI format, and the reserved bit fields may be used to switch both the downlink and uplink BWPs (and/or downlink and uplink sub-bands).

In some implementations, the BWP indicator fields within the DCI message may be reused (or re-interpreted) to switch both downlink and uplink BWPs (and/or downlink and uplink sub-bands) at the UE 115-*c*. For example, in some cases, a first bit of the BWP indicator field may be used to switch the downlink BWP (and/or downlink sub-band), and a second bit of the BWP indicator field may be used to switch the uplink BWP (and/or uplink sub-band), or vice versa. Similarly, by way of another example, the first two bits (first pair of bits) of the BWP indicator field (e.g., bits #1 and 2) may be used to switch the downlink BWP (and/or downlink sub-band), and the second two bits (second pair of bits) of the BWP indicator field (e.g., bits #3 and 4) may be used to switch the uplink BWP (and/or uplink sub-band), or vice versa.

In other cases, the DCI message may switch both the downlink and uplink BWPs (and/or downlink and uplink sub-bands) at the UE 115-*c* by indicating or activating a new BWP pair ID. For example, the control signaling at 310 may activate a first BWP pair ID associated with a first uplink BWP and a first downlink BWP. In this example, the DCI message may indicate or activate a second BWP pair ID associated with a second uplink BWP and a second downlink BWP. The indication of the second BWP pair ID may be indicated via BWP indicator fields within the DCI message, other bit fields (e.g., MCS, TDRA) within the DCI message, or both.

Moreover, in some cases, the DCI message may include a GC-DCI message (e.g., DCI format 2_x) that switches both downlink and uplink BWPs (and/or both downlink and uplink sub-bands) for multiple UEs 115 including the UE 115-*c*. In such cases, the network node 105-*b* may transmit the GC-DCI message to a group of UEs 115 that are associated with the same downlink/uplink BWP configuration (and/or same downlink/uplink sub-band configuration) for SBFD operation.

At 320, the UE 115-*c* may switch to the second downlink BWP and the second uplink BWP (and/or the second downlink sub-band and the second uplink sub-band) based on the received DCI message. In other words, the UE 115-*c* may perform a BWP or sub-band switching procedure. In some cases, switching to the new downlink and uplink BWPs/sub-bands may include re-tuning RF components at the UE 115-*c*.

At 325, the UE 115-*c* may perform full-duplex communications within the second downlink BWP and the second uplink BWP (and/or within the second downlink sub-band and the second uplink sub-band). The UE 115-*c* may perform the full-duplex communications at 325 based on receiving the RRC message at 305, receiving the control signaling at 310, receiving the DCI message at 315, switching to the new downlink and uplink BWPs/sub-bands at 320, or any combination thereof. The full-duplex communications performed by the UE 115-*a* at 325 may be performed with the same or different wireless devices, such as the network node 105-*b*, an additional network node 105, another UE 115, and the like.

For example, the UE 115-*c* may receive downlink signals from the network node 105-*a* within the second downlink BWP/sub-band, and may transmit uplink signals to the network node 105-*b* within the second uplink BWP/sub-band. By way of another example, the UE 115-*c* may receive downlink signals from the network node 105-*a* within the second downlink BWP/sub-band, and may transmit signals to another network node 105 (and/or another UE 115) within the second uplink BWP/sub-band.

Techniques described herein may enable both downlink BWPs and uplink BWPs (or downlink sub-bands and uplink sub-bands) to be dynamically switched using a single DCI message. In this regard, techniques described herein may reduce control signaling and network overhead associated with performing BWP or sub-band switching at wireless devices. By enabling both downlink and uplink BWPs/sub-bands to be dynamically switched via a single DCI message, techniques described herein may reduce a latency with which the UE 115-*c* may perform BWP/sub-band switching for SBFD communications. Moreover, by reducing the signaling required to perform both downlink and uplink BWP/sub-band switching, techniques described herein may reduce power consumption at the UE 115-*c*, thereby resulting in improved performance and battery life.

Figure 4:
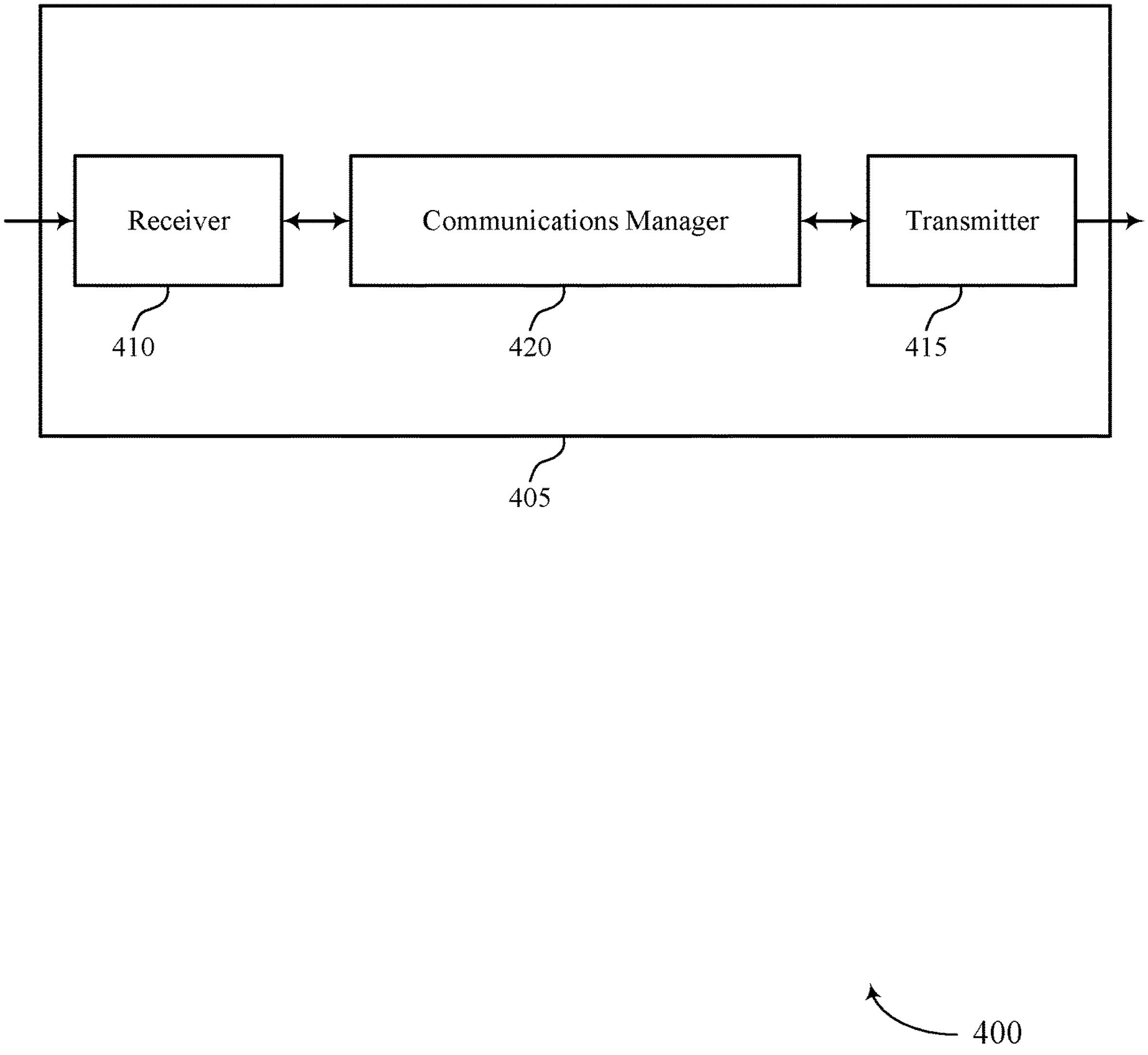
FIGS. 4 and 5 show block diagrams of devices that support techniques for single-DCI switching for downlink and uplink BWPs and sub-bands in accordance with one or more aspects of the present disclosure.

FIG. 4 shows a block diagram 400 of a device 405 that supports techniques for single-DCI switching for downlink and uplink BWPs and sub-bands in accordance with one or more aspects of the present disclosure. The device 405 may be an example of aspects of a UE 115 as described herein. The device 405 may include a receiver 410, a transmitter 415, and a communications manager 420. The device 405 may also include one or more processors, memory coupled with the one or more processors, and instructions stored in the memory that are executable by the one or more processors to enable the one or more processors to perform the single-DCI switching features discussed herein. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for single-DCI switching for downlink and uplink BWPs and sub-bands). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for single-DCI switching for downlink and uplink BWPs and sub-bands). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for single-DCI switching for downlink and uplink BWPs and sub-bands as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

For example, the communications manager 420 may be configured as or otherwise support a means for receiving, from a network node, control signaling indicating a first downlink BWP and a first uplink BWP, or a first downlink sub-band and a first uplink sub-band, or both, for performing SBFD communications. The communications manager 420 may be configured as or otherwise support a means for receiving, from the network node, a DCI message indicating to switch to a second downlink BWP and a second uplink BWP, or to switch to a second downlink sub-band and a second uplink sub-band, or both. The communications manager 420 may be configured as or otherwise support a means for performing full-duplex communications with the network node within the second downlink BWP and the second uplink BWP, or within the second downlink sub-band and the second uplink sub-band, or both.

By including or configuring the communications manager 420 in accordance with examples as described herein, the device 405 (e.g., a processor controlling or otherwise coupled with the receiver 410, the transmitter 415, the communications manager 420, or a combination thereof) may support techniques that enable both downlink BWPs and uplink BWPs (or downlink sub-bands and uplink sub-bands) to be dynamically switched using a single DCI message. In this regard, techniques described herein may reduce control signaling and network overhead associated with performing BWP or sub-band switching at wireless devices. By enabling both downlink and uplink BWPs/sub-bands to be dynamically switched via a single DCI message, techniques described herein may reduce a latency with which UEs 115 may perform BWP/sub-band switching for SBFD communications. Moreover, by reducing the signaling required to perform both downlink and uplink BWP/sub-band switching, techniques described herein may reduce power consumption at the UEs 115, thereby resulting in improved performance and battery life.

Figure 5:
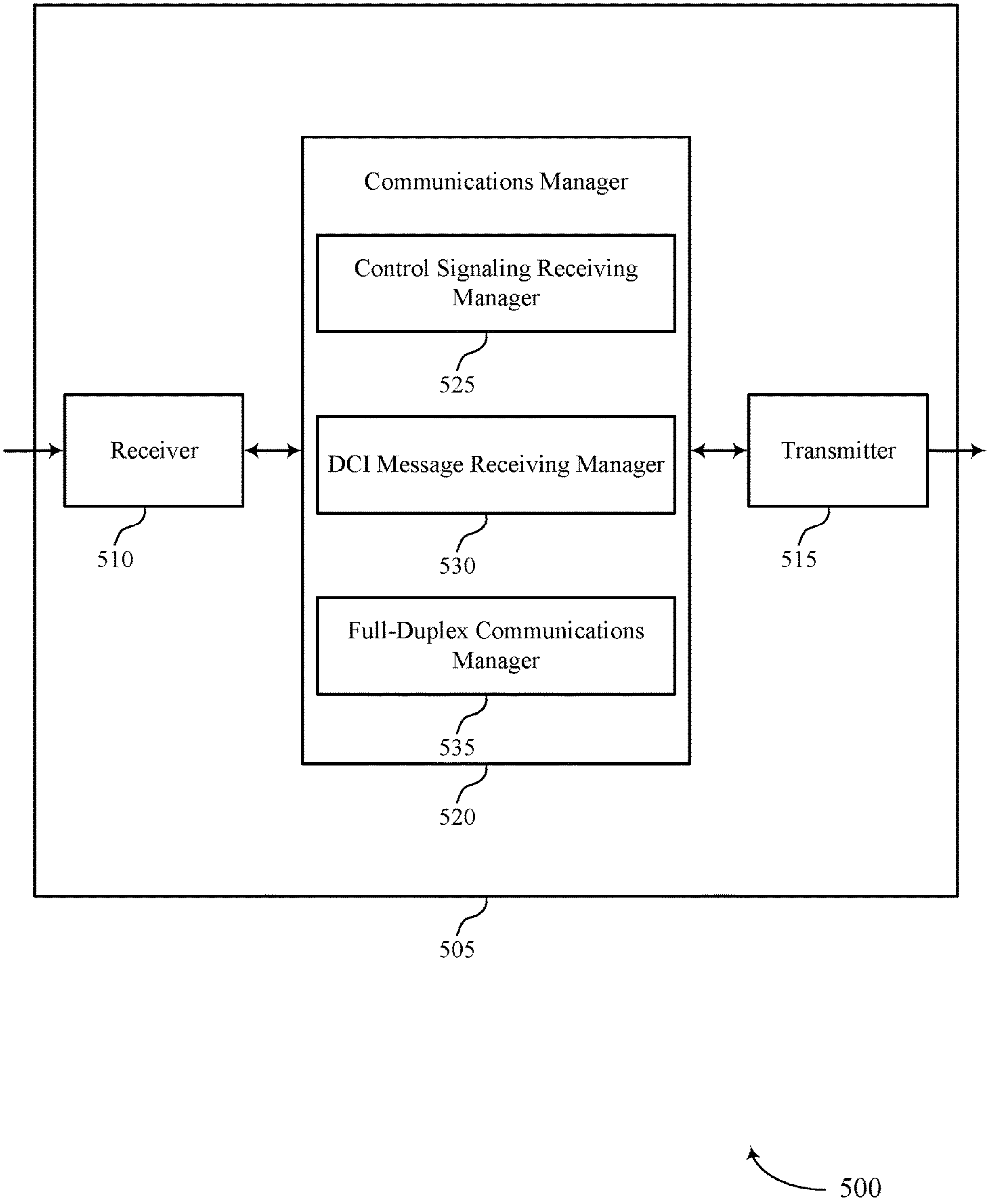

FIG. 5 shows a block diagram 500 of a device 505 that supports techniques for single-DCI switching for downlink and uplink BWPs and sub-bands in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for single-DCI switching for downlink and uplink BWPs and sub-bands). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for single-DCI switching for downlink and uplink BWPs and sub-bands). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for single-DCI switching for downlink and uplink BWPs and sub-bands as described herein. For example, the communications manager 520 may include a control signaling receiving manager 525, a DCI message receiving manager 530, a full-duplex communications manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The control signaling receiving manager 525 may be configured as or otherwise support a means for receiving, from a network node, control signaling indicating a first downlink BWP and a first uplink BWP, or a first downlink sub-band and a first uplink sub-band, or both, for performing SBFD communications. The DCI message receiving manager 530 may be configured as or otherwise support a means for receiving, from the network node, a DCI message indicating to switch to a second downlink BWP and a second uplink BWP, or to switch to a second downlink sub-band and a second uplink sub-band, or both. The full-duplex communications manager 535 may be configured as or otherwise support a means for performing full-duplex communications with the network node within the second downlink BWP and the second uplink BWP, or within the second downlink sub-band and the second uplink sub-band, or both.

In some cases, the control signaling receiving manager 525, the DCI message receiving manager 530, and the full-duplex communications manager 535 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling receiving manager 525, the DCI message receiving manager 530, and the full-duplex communications manager 535 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 6:
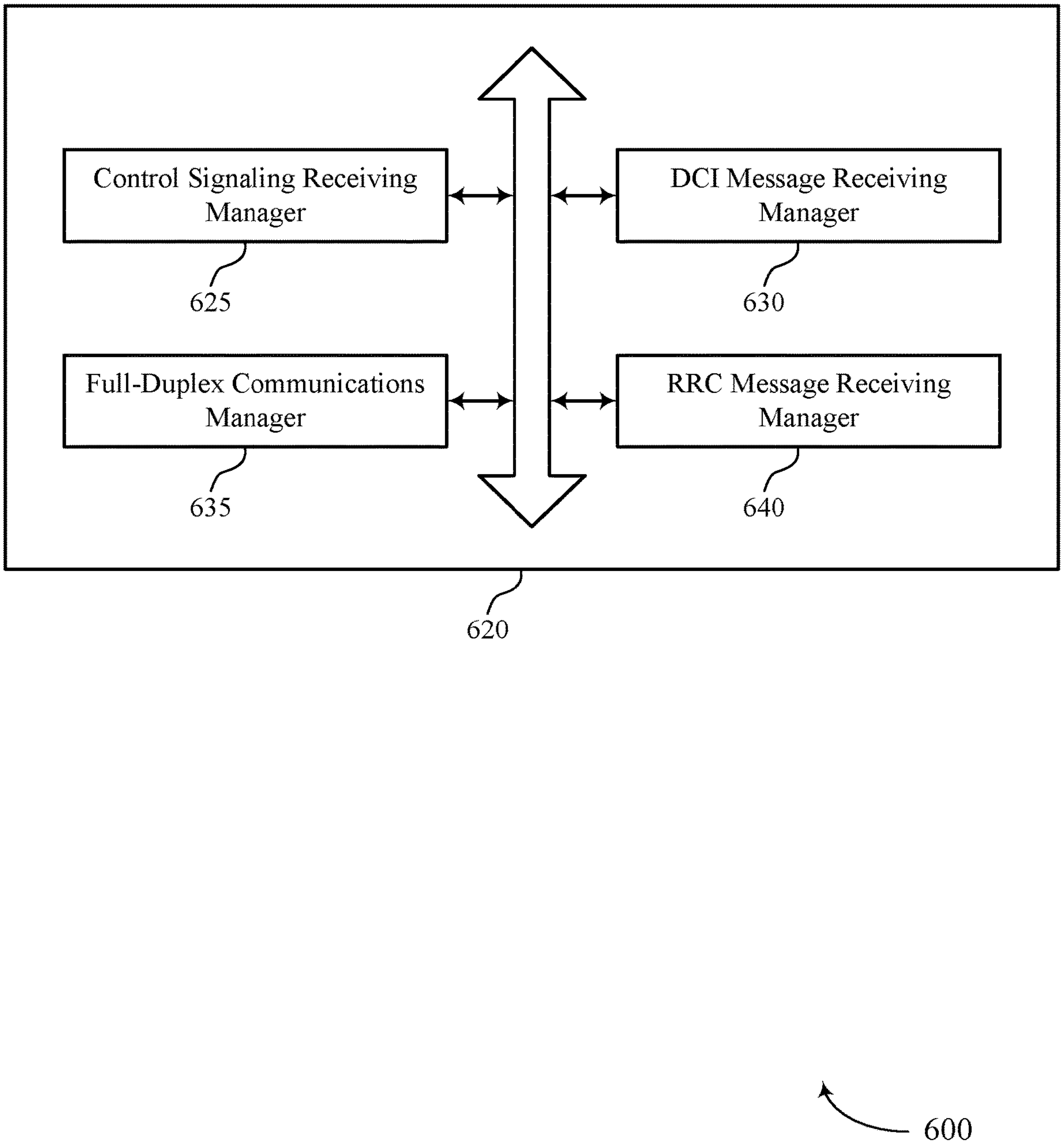
FIG. 6 shows a block diagram of a communications manager that supports techniques for single-DCI switching for downlink and uplink BWPs and sub-bands in accordance with one or more aspects of the present disclosure.

FIG. 6 shows a block diagram 600 of a communications manager 620 that supports techniques for single-DCI switching for downlink and uplink BWPs and sub-bands in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for single-DCI switching for downlink and uplink BWPs and sub-bands as described herein. For example, the communications manager 620 may include a control signaling receiving manager 625, a DCI message receiving manager 630, a full-duplex communications manager 635, an RRC message receiving manager 640, or any combination thereof. Each of these components may communicate, directly or indirectly, with one another (e.g., via one or more buses).

The control signaling receiving manager 625 may be configured as or otherwise support a means for receiving, from a network node, control signaling indicating a first downlink BWP and a first uplink BWP, or a first downlink sub-band and a first uplink sub-band, or both, for performing SBFD communications. The DCI message receiving manager 630 may be configured as or otherwise support a means for receiving, from the network node, a DCI message indicating to switch to a second downlink BWP and a second uplink BWP, or to switch to a second downlink sub-band and a second uplink sub-band, or both. The full-duplex communications manager 635 may be configured as or otherwise support a means for performing full-duplex communications with the network node within the second downlink BWP and the second uplink BWP, or within the second downlink sub-band and the second uplink sub-band, or both.

In some examples, the DCI message receiving manager 630 may be configured as or otherwise support a means for receiving, via the DCI message, one or more bit values of a BWP indicator field indicating the second downlink BWP or the second uplink BWP. In some examples, the DCI message receiving manager 630 may be configured as or otherwise support a means for receiving, via the DCI message, one or more additional bit field values indicating an other of the second downlink BWP or the second uplink BWP, where the full-duplex communications are performed within the second downlink BWP and the second uplink BWP based on the one or more BWP indicator field values and the one or more additional bit field values.

In some examples, the DCI message receiving manager 630 may be configured as or otherwise support a means for determining that the one or more additional bit field values indicate the other of the second downlink BWP or the second uplink BWP based on the DCI message not scheduling data at the UE. In some examples, the one or more additional bit field values include an MCS bit field, a TDRA bit field, or both.

In some examples, the DCI message receiving manager 630 may be configured as or otherwise support a means for determining that one or more bit field values within the DCI message indicate the second downlink BWP and the second uplink BWP based on the DCI message not scheduling data at the UE.

In some examples, the RRC message receiving manager 640 may be configured as or otherwise support a means for receiving, from the network node, a RRC message indicating a DCI format including one or more bits used to switch downlink BWPs, downlink sub-bands, uplink BWPs, uplink sub-bands, or any combination thereof, where the DCI message is associated with the DCI format.

In some examples, the DCI message receiving manager 630 may be configured as or otherwise support a means for receiving, via the DCI message, a first bit value of a BWP indicator field indicating the second downlink BWP. In some examples, the DCI message receiving manager 630 may be configured as or otherwise support a means for receiving, via the DCI message, a second bit value of the BWP indicator field indicating the second uplink BWP, where the full-duplex communications are performed within the second downlink BWP and the second uplink BWP based on the first bit value and the second bit value of the BWP indicator field.

In some examples, the DCI message receiving manager 630 may be configured as or otherwise support a means for receiving, via the DCI message, a first pair of bit values of a BWP indicator field indicating the second downlink BWP. In some examples, the DCI message receiving manager 630 may be configured as or otherwise support a means for receiving, via the DCI message, a second pair of bit values of the BWP indicator field indicating the second uplink BWP, where the full-duplex communications are performed within the second downlink BWP and the second uplink BWP based on the first pair of bit values and the second pair of bit values of the BWP indicator field.

In some examples, the DCI message receiving manager 630 may be configured as or otherwise support a means for receiving, via the DCI message, one or more bit values of a BWP indicator field indicating a downlink and uplink BWP pair or set identifier associated with the second downlink BWP and the second uplink BWP.

In some examples, the control signaling receiving manager 625 may be configured as or otherwise support a means for receiving, from the network node via the control signaling, additional control signaling, or both, an indication of a set of multiple downlink and uplink BWP pair or set identifiers, where each downlink and uplink BWP pair or set identifier is associated with a respective downlink BWP and a respective uplink BWP, where the set of multiple downlink and uplink BWP pair or set identifiers include the downlink and uplink BWP pair or set identifier, and where receiving the DCI message is based on receiving the indication of the set of multiple downlink and uplink BWP pair or set identifiers.

In some examples, the DCI message includes a group-common DCI message.

In some examples, the DCI message receiving manager 630 may be configured as or otherwise support a means for receiving, via the DCI message, an indication of respective starting and ending resource block indices associated with each of the second downlink sub-band and the second uplink sub-band, an indication of respective resource block set indices associated with each of the second downlink sub-band and the second uplink sub-band, or both.

In some examples, the DCI message receiving manager 630 may be configured as or otherwise support a means for determining that one or more bit field values received via the DCI message indicate the second downlink sub-band and the second uplink sub-band based on the DCI message not scheduling data at the UE, where the one or more bit field values include an MCS bit field, a TDRA bit field, or both.

In some cases, the control signaling receiving manager 625, the DCI message receiving manager 630, the full-duplex communications manager 635, and the RRC message receiving manager 640 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling receiving manager 625, the DCI message receiving manager 630, the full-duplex communications manager 635, and the RRC message receiving manager 640 discussed herein.

Figure 7:
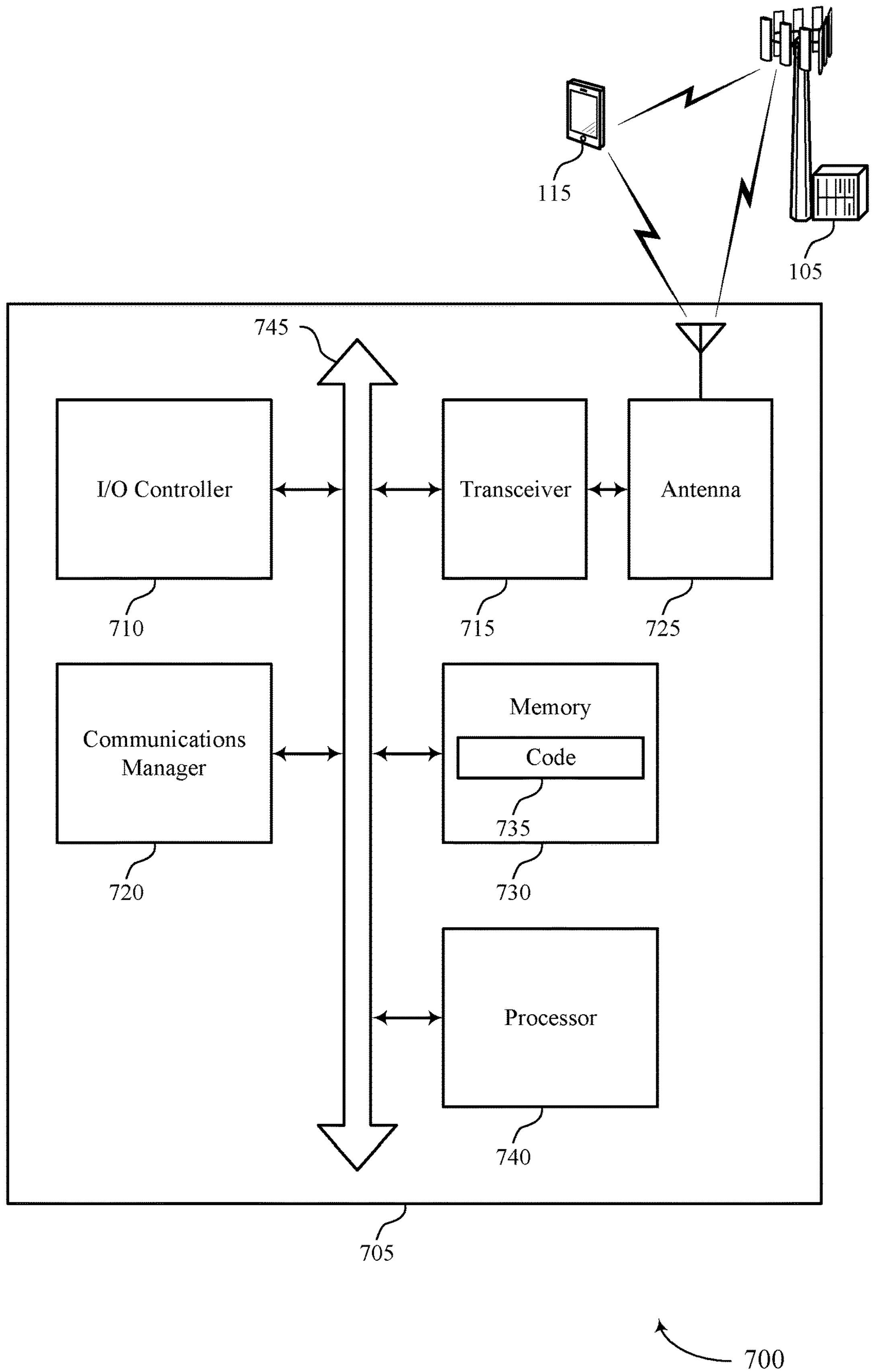
FIG. 7 shows a diagram of a system including a device that supports techniques for single-DCI switching for downlink and uplink BWPs and sub-bands in accordance with one or more aspects of the present disclosure.

FIG. 7 shows a diagram of a system 700 including a device 705 that supports techniques for single-DCI switching for downlink and uplink BWPs and sub-bands in accordance with one or more aspects of the present disclosure. The device 705 may be an example of or include the components of a device 405, a device 505, or a UE 115 as described herein. The device 705 may communicate (e.g., wirelessly) with one or more network nodes 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for single-DCI switching for downlink and uplink BWPs and sub-bands). For example, the device 705 or a component of the device 705 may include a processor 740 and memory 730 coupled with or to the processor 740, the processor 740 and memory 730 configured to perform various functions described herein.

For example, the communications manager 720 may be configured as or otherwise support a means for receiving, from a network node, control signaling indicating a first downlink BWP and a first uplink BWP, or a first downlink sub-band and a first uplink sub-band, or both, for performing SBFD communications. The communications manager 720 may be configured as or otherwise support a means for receiving, from the network node, a DCI message indicating to switch to a second downlink BWP and a second uplink BWP, or to switch to a second downlink sub-band and a second uplink sub-band, or both. The communications manager 720 may be configured as or otherwise support a means for performing full-duplex communications with the network node within the second downlink BWP and the second uplink BWP, or within the second downlink sub-band and the second uplink sub-band, or both.

By including or configuring the communications manager 720 in accordance with examples as described herein, the device 705 may support techniques that enable both downlink BWPs and uplink BWPs (or downlink sub-bands and uplink sub-bands) to be dynamically switched using a single DCI message. In this regard, techniques described herein may reduce control signaling and network overhead associated with performing BWP or sub-band switching at wireless devices. By enabling both downlink and uplink BWPs/sub-bands to be dynamically switched via a single DCI message, techniques described herein may reduce a latency with which UEs 115 may perform BWP/sub-band switching for SBFD communications. Moreover, by reducing the signaling required to perform both downlink and uplink BWP/sub-band switching, techniques described herein may reduce power consumption at the UEs 115, thereby resulting in improved performance and battery life.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for single-DCI switching for downlink and uplink BWPs and sub-bands as described herein, or the processor 740 and the memory 730 may be otherwise configured to perform or support such operations.

Figure 8:
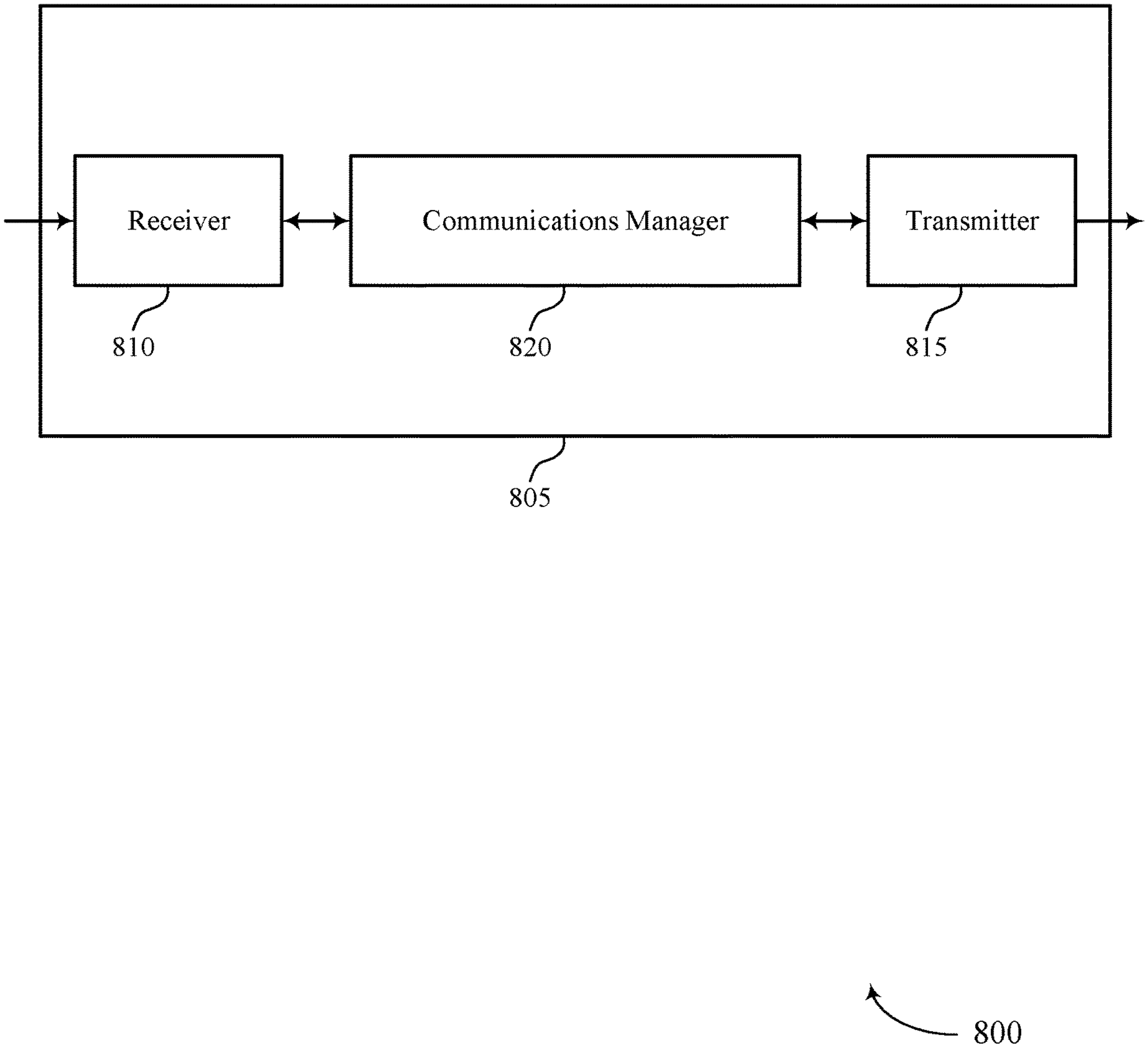
FIGS. 8 and 9 show block diagrams of devices that support techniques for single-DCI switching for downlink and uplink BWPs and sub-bands in accordance with one or more aspects of the present disclosure.

FIG. 8 shows a block diagram 800 of a device 805 that supports techniques for single-DCI switching for downlink and uplink BWPs and sub-bands in accordance with one or more aspects of the present disclosure. The device 805 may be an example of aspects of a network node 105 as described herein. The device 805 may include a receiver 810, a transmitter 815, and a communications manager 820. The device 805 may also include one or more processors, memory coupled with the one or more processors, and instructions stored in the memory that are executable by the one or more processors to enable the one or more processors to perform the single-DCI switching features discussed herein. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for single-DCI switching for downlink and uplink BWPs and sub-bands as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

For example, the communications manager 820 may be configured as or otherwise support a means for transmitting, to a UE, control signaling indicating a first downlink BWP and a first uplink BWP, or a first downlink sub-band and a first uplink sub-band, or both, for performing SBFD communications, or both. The communications manager 820 may be configured as or otherwise support a means for transmitting, to the UE, a DCI message indicating to switch to a second downlink BWP and a second uplink BWP, or to switch to a second downlink sub-band and a second uplink sub-band, or both. The communications manager 820 may be configured as or otherwise support a means for performing full-duplex communications with the UE within the second downlink BWP and the second uplink BWP, or within the second downlink sub-band and the second uplink sub-band, or both.

By including or configuring the communications manager 820 in accordance with examples as described herein, the device 805 (e.g., a processor controlling or otherwise coupled with the receiver 810, the transmitter 815, the communications manager 820, or a combination thereof) may support techniques that enable both downlink BWPs and uplink BWPs (or downlink sub-bands and uplink sub-bands) to be dynamically switched using a single DCI message. In this regard, techniques described herein may reduce control signaling and network overhead associated with performing BWP or sub-band switching at wireless devices. By enabling both downlink and uplink BWPs/sub-bands to be dynamically switched via a single DCI message, techniques described herein may reduce a latency with which UEs 115 may perform BWP/sub-band switching for SBFD communications. Moreover, by reducing the signaling required to perform both downlink and uplink BWP/sub-band switching, techniques described herein may reduce power consumption at the UEs 115, thereby resulting in improved performance and battery life.

Figure 9:
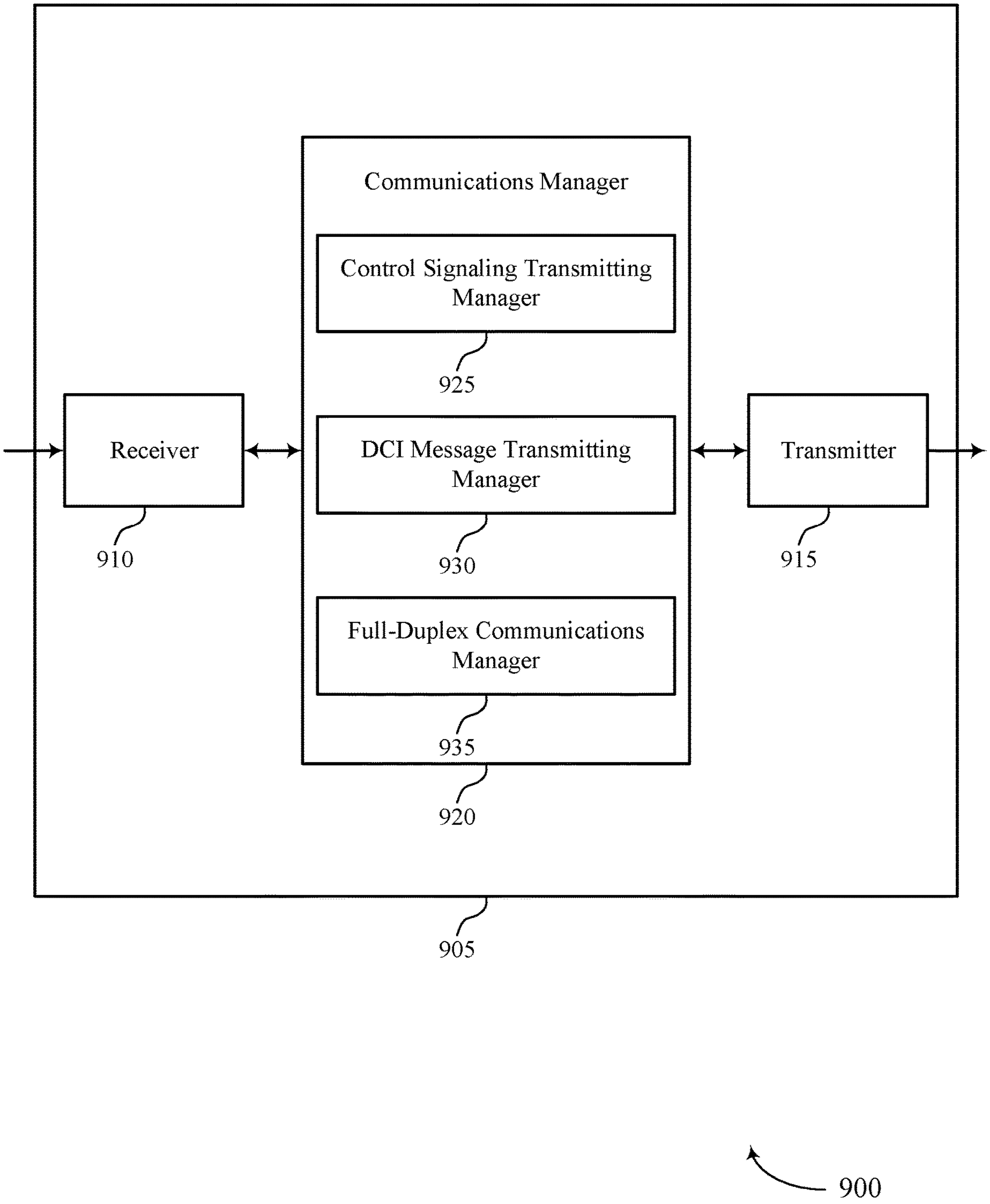

FIG. 9 shows a block diagram 900 of a device 905 that supports techniques for single-DCI switching for downlink and uplink BWPs and sub-bands in accordance with one or more aspects of the present disclosure. The device 905 may be an example of aspects of a device 805 or a network node 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for single-DCI switching for downlink and uplink BWPs and sub-bands as described herein. For example, the communications manager 920 may include a control signaling transmitting manager 925, a DCI message transmitting manager 930, a full-duplex communications manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The control signaling transmitting manager 925 may be configured as or otherwise support a means for transmitting, to a UE, control signaling indicating a first downlink BWP and a first uplink BWP, or a first downlink sub-band and a first uplink sub-band, or both, for performing SBFD communications, or both. The DCI message transmitting manager 930 may be configured as or otherwise support a means for transmitting, to the UE, a DCI message indicating to switch to a second downlink BWP and a second uplink BWP, or to switch to a second downlink sub-band and a second uplink sub-band, or both. The full-duplex communications manager 935 may be configured as or otherwise support a means for performing full-duplex communications with the UE within the second downlink BWP and the second uplink BWP, or within the second downlink sub-band and the second uplink sub-band, or both.

In some cases, the control signaling transmitting manager 925, the DCI message transmitting manager 930, and the full-duplex communications manager 935 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling transmitting manager 925, the DCI message transmitting manager 930, and the full-duplex communications manager 935 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 10:
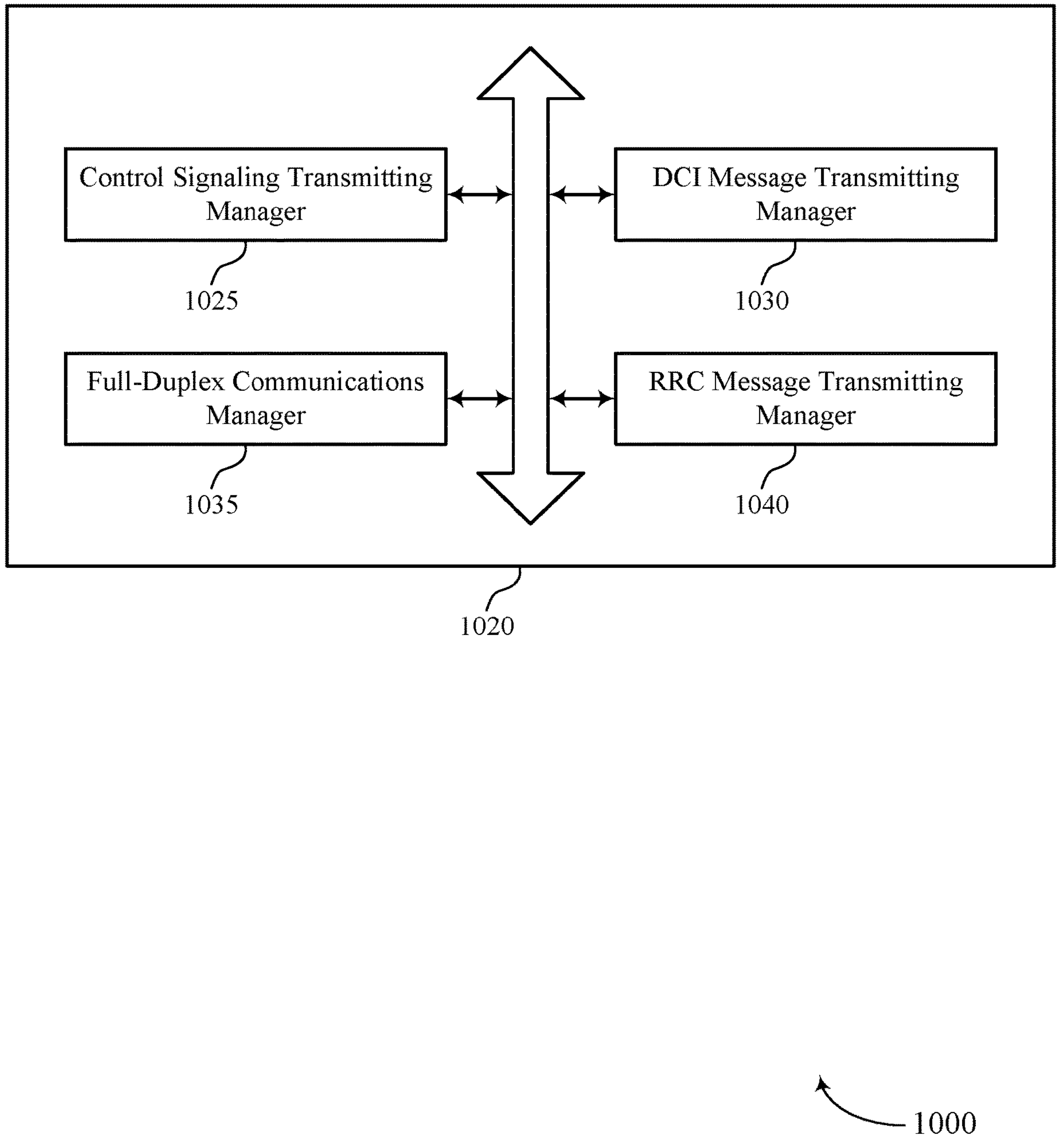
FIG. 10 shows a block diagram of a communications manager that supports techniques for single-DCI switching for downlink and uplink BWPs and sub-bands in accordance with one or more aspects of the present disclosure.

FIG. 10 shows a block diagram 1000 of a communications manager 1020 that supports techniques for single-DCI switching for downlink and uplink BWPs and sub-bands in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for single-DCI switching for downlink and uplink BWPs and sub-bands as described herein. For example, the communications manager 1020 may include a control signaling transmitting manager 1025, a DCI message transmitting manager 1030, a full-duplex communications manager 1035, an RRC message transmitting manager 1040, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network node 105, between devices, components, or virtualized components associated with a network node 105), or any combination thereof.

The control signaling transmitting manager 1025 may be configured as or otherwise support a means for transmitting, to a UE, control signaling indicating a first downlink BWP and a first uplink BWP, or a first downlink sub-band and a first uplink sub-band, or both, for performing SBFD communications, or both. The DCI message transmitting manager 1030 may be configured as or otherwise support a means for transmitting, to the UE, a DCI message indicating to switch to a second downlink BWP and a second uplink BWP, or to switch to a second downlink sub-band and a second uplink sub-band, or both. The full-duplex communications manager 1035 may be configured as or otherwise support a means for performing full-duplex communications with the UE within the second downlink BWP and the second uplink BWP, or within the second downlink sub-band and the second uplink sub-band, or both.

In some examples, the DCI message transmitting manager 1030 may be configured as or otherwise support a means for transmitting, via the DCI message, one or more bit values of a BWP indicator field indicating the second downlink BWP or the second uplink BWP. In some examples, the DCI message transmitting manager 1030 may be configured as or otherwise support a means for transmitting, via the DCI message, one or more additional bit field values indicating an other of the second downlink BWP or the second uplink BWP, where the full-duplex communications are performed within the second downlink BWP and the second uplink BWP based on the one or more BWP indicator field values and the one or more additional bit field values.

In some examples, the DCI message transmitting manager 1030 may be configured as or otherwise support a means for transmitting one or more additional bit field values via the DCI message, where the one or more additional bit field values indicate the other of the second downlink BWP or the second uplink BWP based on the DCI message not scheduling data at the UE. In some examples, the one or more additional bit field values include an MCS bit field, a TDRA bit field, or both.

In some examples, the DCI message transmitting manager 1030 may be configured as or otherwise support a means for transmitting one or more bit field values via the DCI message, where the one or more bit field values indicate the second downlink BWP and the second uplink BWP based on the DCI message not scheduling data at the UE.

In some examples, the RRC message transmitting manager 1040 may be configured as or otherwise support a means for transmitting, to the UE, a RRC message indicating a DCI format including one or more bits used to switch downlink BWPs, downlink sub-bands, uplink BWPs, uplink sub-bands, or any combination thereof, where the DCI message is associated with the DCI format.

In some examples, the DCI message transmitting manager 1030 may be configured as or otherwise support a means for transmitting, via the DCI message, a first bit value of BWP indicator field indicating the second downlink BWP. In some examples, the DCI message transmitting manager 1030 may be configured as or otherwise support a means for transmitting, via the DCI message, a second bit value of the BWP indicator field indicating the second uplink BWP, where the full-duplex communications are performed within the second downlink BWP and the second uplink BWP based on the first bit value and the second bit value of the BWP indicator field.

In some examples, the DCI message transmitting manager 1030 may be configured as or otherwise support a means for transmitting, via the DCI message, a first pair of bit values of a BWP indicator field indicating the second downlink BWP. In some examples, the DCI message transmitting manager 1030 may be configured as or otherwise support a means for transmitting, via the DCI message, a second pair of bit values of the BWP indicator field indicating the second uplink BWP, where the full-duplex communications are performed within the second downlink BWP and the second uplink BWP based on the first pair of bit values and the second pair of bit values of the BWP indicator field.

In some examples, the DCI message transmitting manager 1030 may be configured as or otherwise support a means for transmitting, via the DCI message, one or more bit values of a BWP indicator field indicating a downlink and uplink BWP pair or set identifier associated with the second downlink BWP and the second uplink BWP.

In some examples, the control signaling transmitting manager 1025 may be configured as or otherwise support a means for transmitting, from the UE via the control signaling, additional control signaling, or both, an indication of a set of multiple downlink and uplink BWP pair or set identifiers, where each downlink and uplink BWP pair or set identifier is associated with a respective downlink BWP and a respective uplink BWP, where the set of multiple downlink and uplink BWP pair or set identifiers include the downlink and uplink BWP pair or set identifier, and where transmitting the DCI message is based on transmitting the indication of the set of multiple downlink and uplink BWP pair or set identifiers.

In some examples, the DCI message includes a group-common DCI message.

In some examples, the DCI message transmitting manager 1030 may be configured as or otherwise support a means for transmitting, via the DCI message, an indication of respective starting and ending resource block indices associated with each of the second downlink sub-band and the second uplink sub-band, an indication of respective resource block set indices associated with each of the second downlink sub-band and the second uplink sub-band, or both.

In some examples, the DCI message transmitting manager 1030 may be configured as or otherwise support a means for transmitting one or more bit field values via the DCI message, where the one or more bit field values indicate the second downlink sub-band and the second uplink sub-band based on the DCI message not scheduling data at the UE, where the one or more bit field values include an MCS bit field, a TDRA bit field, or both.

In some cases, the control signaling transmitting manager 1025, the DCI message transmitting manager 1030, the full-duplex communications manager 1035, and the RRC message transmitting manager 1040 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling transmitting manager 1025, the DCI message transmitting manager 1030, the full-duplex communications manager 1035, and the RRC message transmitting manager 1040 discussed herein.

Figure 11:
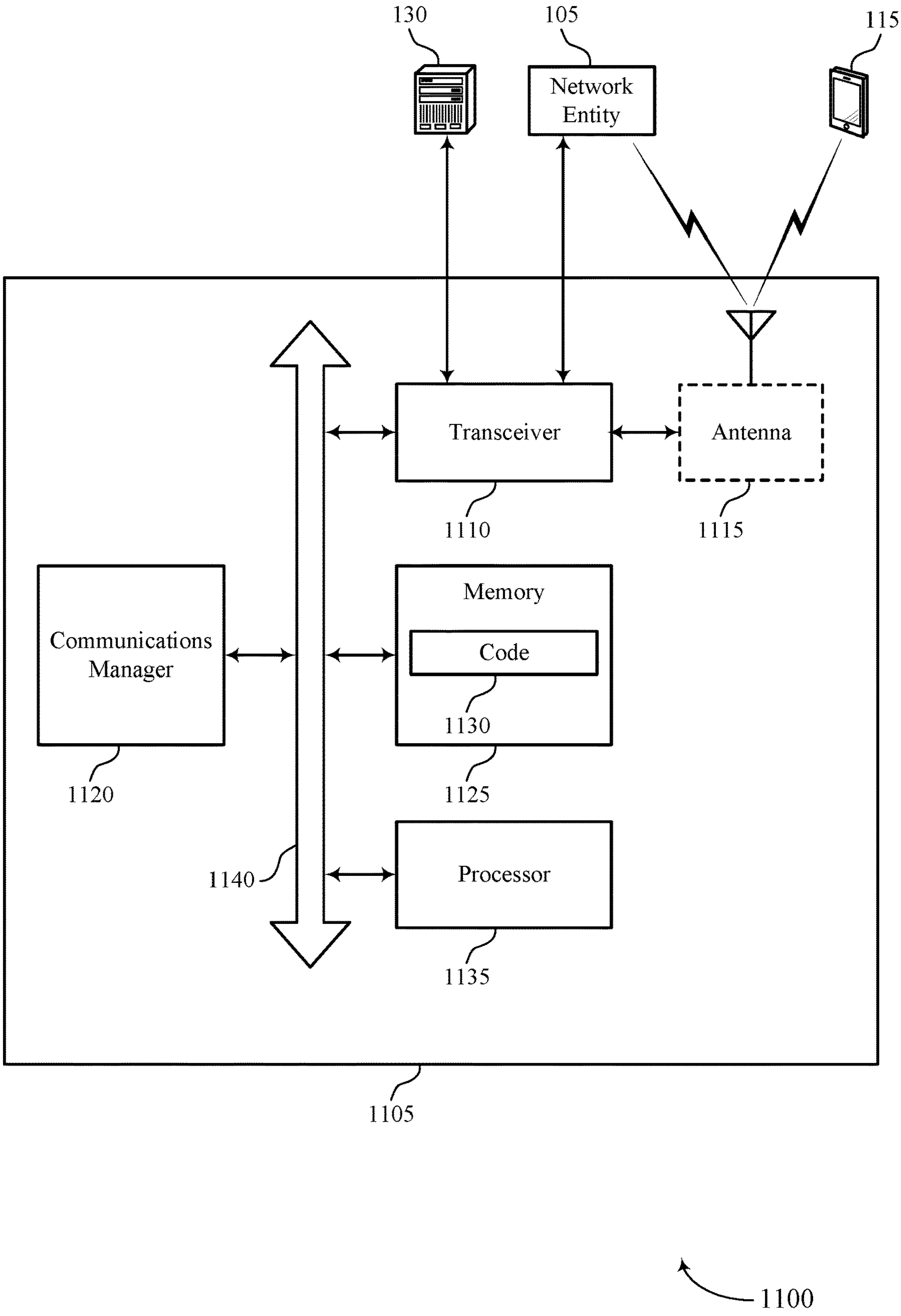
FIG. 11 shows a diagram of a system including a device that supports techniques for single-DCI switching for downlink and uplink BWPs and sub-bands in accordance with one or more aspects of the present disclosure.

FIG. 11 shows a diagram of a system 1100 including a device 1105 that supports techniques for single-DCI switching for downlink and uplink BWPs and sub-bands in accordance with one or more aspects of the present disclosure. The device 1105 may be an example of or include the components of a device 805, a device 905, or a network node 105 as described herein. The device 1105 may communicate with one or more network nodes 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting techniques for single-DCI switching for downlink and uplink BWPs and sub-bands). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links).

For example, the communications manager 1120 may manage the transfer of data communications for client devices, such as one or more UEs 115. In some examples, the communications manager 1120 may manage communications with other network nodes 105, and may include a controller or scheduler for controlling communications with UEs 115 in cooperation with other network nodes 105. In some examples, the communications manager 1120 may support an X2 interface within an LTE/LTE-A wireless communications network technology to provide communication between network nodes 105.

For example, the communications manager 1120 may be configured as or otherwise support a means for transmitting, to a UE, control signaling indicating a first downlink BWP and a first uplink BWP, or a first downlink sub-band and a first uplink sub-band, or both, for performing SBFD communications, or both. The communications manager 1120 may be configured as or otherwise support a means for transmitting, to the UE, a DCI message indicating to switch to a second downlink BWP and a second uplink BWP, or to switch to a second downlink sub-band and a second uplink sub-band, or both. The communications manager 1120 may be configured as or otherwise support a means for performing full-duplex communications with the UE within the second downlink BWP and the second uplink BWP, or within the second downlink sub-band and the second uplink sub-band, or both.

By including or configuring the communications manager 1120 in accordance with examples as described herein, the device 1105 may support techniques that enable both downlink BWPs and uplink BWPs (or downlink sub-bands and uplink sub-bands) to be dynamically switched using a single DCI message. In this regard, techniques described herein may reduce control signaling and network overhead associated with performing BWP or sub-band switching at wireless devices. By enabling both downlink and uplink BWPs/sub-bands to be dynamically switched via a single DCI message, techniques described herein may reduce a latency with which UEs 115 may perform BWP/sub-band switching for SBFD communications. Moreover, by reducing the signaling required to perform both downlink and uplink BWP/sub-band switching, techniques described herein may reduce power consumption at the UEs 115, thereby resulting in improved performance and battery life.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of techniques for single-DCI switching for downlink and uplink BWPs and sub-bands as described herein, or the processor 1135 and the memory 1125 may be otherwise configured to perform or support such operations.

Figure 12:
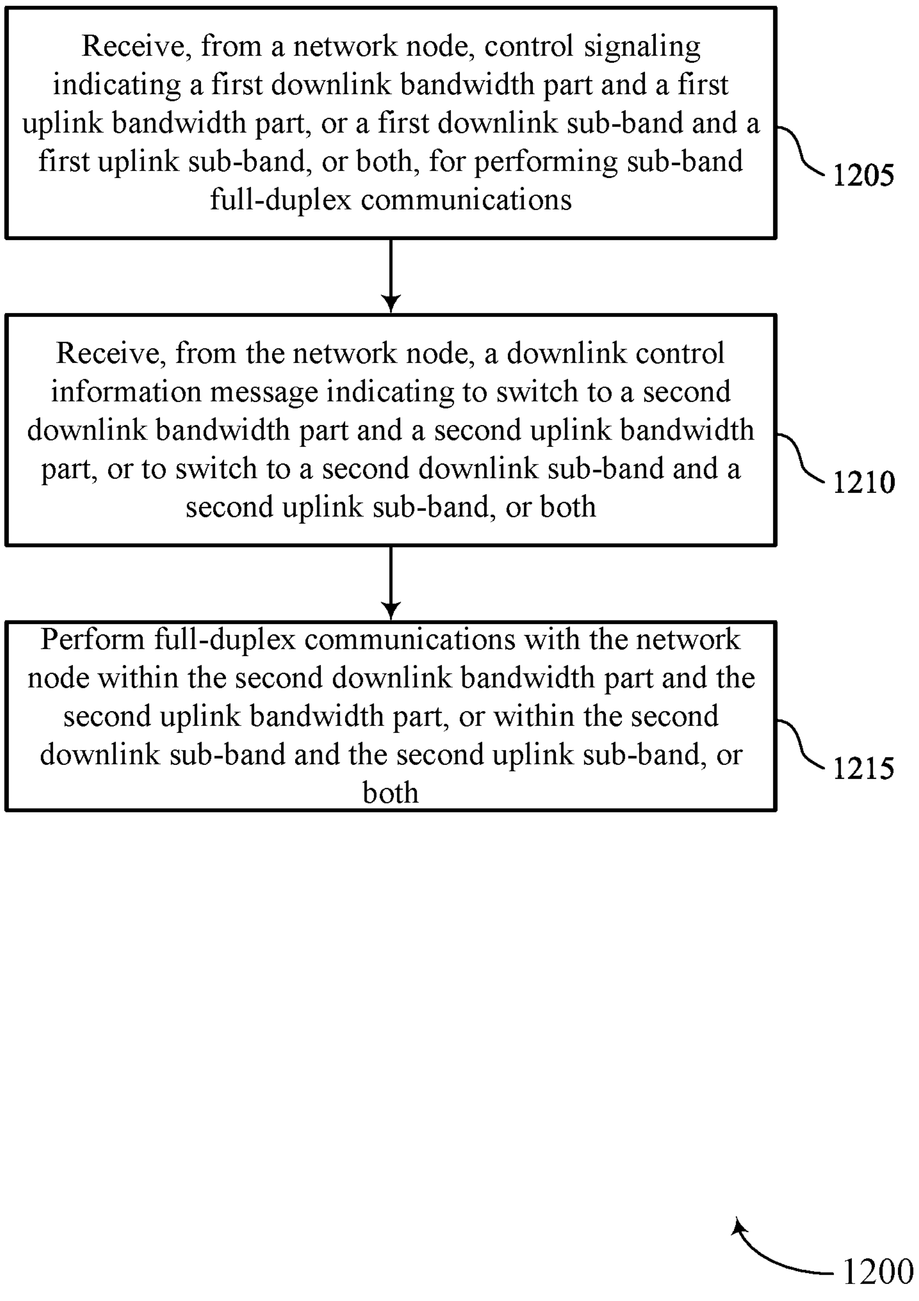
FIGS. 12 and 13 show flowcharts illustrating methods that support techniques for single-DCI switching for downlink and uplink BWPs and sub-bands in accordance with one or more aspects of the present disclosure.

FIG. 12 shows a flowchart illustrating a method 1200 that supports techniques for single-DCI switching for downlink and uplink BWPs and sub-bands in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a network node, control signaling indicating a first downlink BWP and a first uplink BWP, or a first downlink sub-band and a first uplink sub-band, or both, for performing SBFD communications. The operations of 1205 may be performed in accordance with examples as disclosed herein. In some examples, aspects of the operations of 1205 may be performed by a control signaling receiving manager 625 as described with reference to FIG. 6.

At 1210, the method may include receiving, from the network node, a DCI message indicating to switch to a second downlink BWP and a second uplink BWP, or to switch to a second downlink sub-band and a second uplink sub-band, or both. The operations of 1210 may be performed in accordance with examples as disclosed herein. In some examples, aspects of the operations of 1210 may be performed by a DCI message receiving manager 630 as described with reference to FIG. 6.

At 1215, the method may include performing full-duplex communications with the network node within the second downlink BWP and the second uplink BWP, or within the second downlink sub-band and the second uplink sub-band, or both. The operations of 1215 may be performed in accordance with examples as disclosed herein. In some examples, aspects of the operations of 1215 may be performed by a full-duplex communications manager 635 as described with reference to FIG. 6.

Figure 13:
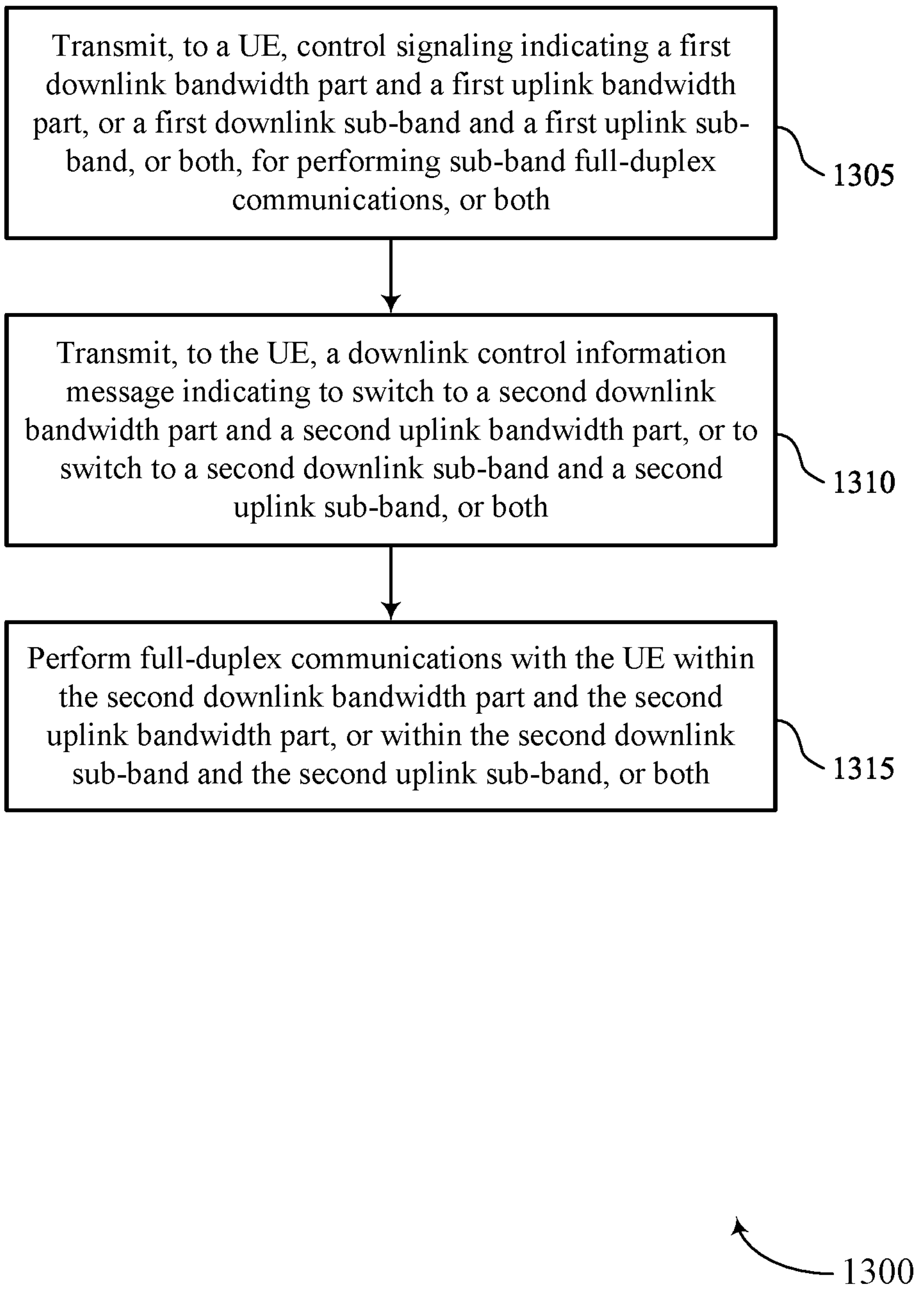

FIG. 13 shows a flowchart illustrating a method 1300 that supports techniques for single-DCI switching for downlink and uplink BWPs and sub-bands in accordance with one or more aspects of the present disclosure. The operations of the method 1300 may be implemented by a network node or its components as described herein. For example, the operations of the method 1300 may be performed by a network node as described with reference to FIGS. 1 through 3 and 8 through 11. In some examples, a network node may execute a set of instructions to control the functional elements of the network node to perform the described functions. Additionally, or alternatively, the network node may perform aspects of the described functions using special-purpose hardware.

At 1305, the method may include transmitting, to a UE, control signaling indicating a first downlink BWP and a first uplink BWP, or a first downlink sub-band and a first uplink sub-band, or both, for performing SBFD communications, or both. The operations of 1305 may be performed in accordance with examples as disclosed herein. In some examples, aspects of the operations of 1305 may be performed by a control signaling transmitting manager 1025 as described with reference to FIG. 10.

At 1310, the method may include transmitting, to the UE, a DCI message indicating to switch to a second downlink BWP and a second uplink BWP, or to switch to a second downlink sub-band and a second uplink sub-band, or both. The operations of 1310 may be performed in accordance with examples as disclosed herein. In some examples, aspects of the operations of 1310 may be performed by a DCI message transmitting manager 1030 as described with reference to FIG. 10.

At 1315, the method may include performing full-duplex communications with the UE within the second downlink BWP and the second uplink BWP, or within the second downlink sub-band and the second uplink sub-band, or both. The operations of 1315 may be performed in accordance with examples as disclosed herein. In some examples, aspects of the operations of 1315 may be performed by a full-duplex communications manager 1035 as described with reference to FIG. 10.

The following provides an overview of aspects of the present disclosure:

Aspect 1: A method for wireless communication at a UE, comprising: receiving, from a network entity, control signaling indicating a first downlink BWP and a first uplink BWP, or a first downlink sub-band and a first uplink sub-band, or both, for performing SBFD communications; receiving, from the network entity, a DCI message indicating to switch to a second downlink BWP and a second uplink BWP, or to switch to a second downlink sub-band and a second uplink sub-band, or both; and performing full-duplex communications with the network entity within the second downlink BWP and the second uplink BWP, or within the second downlink sub-band and the second uplink sub-band, or both.

Aspect 2: The method of aspect 1, further comprising: receiving, via the DCI message, one or more BWP indicator field values indicating the second downlink BWP or the second uplink BWP; and receiving, via the DCI message, one or more additional bit field values indicating an other of the second downlink BWP or the second uplink BWP, wherein the full-duplex communications are performed within the second downlink BWP and the second uplink BWP based at least in part on the one or more BWP indicator field values and the one or more additional bit field values.

Aspect 3: The method of aspect 2, further comprising: determining that the one or more additional bit field values indicate the other of the second downlink BWP or the second uplink BWP based at least in part on the DCI message not scheduling data at the UE.

Aspect 4: The method of any of aspects 2 through 3, wherein the one or more additional bit field values comprise an MCS bit field, a TDRA bit field, or both.

Aspect 5: The method of any of aspects 1 through 4, further comprising: determining that one or more bit field values within the DCI message indicate the second downlink BWP and the second uplink BWP based at least in part on the DCI message not scheduling data at the UE.

Aspect 6: The method of any of aspects 1 through 5, further comprising: receiving, from the network entity, a RRC message indicating a DCI format comprising one or more reserved bits used to switch downlink BWPs, uplink BWPs, or both, wherein the DCI message is associated with the DCI format.

Aspect 7: The method of any of aspects 1 through 6, further comprising: receiving, from the network entity, a RRC message indicating a DCI format comprising one or more reserved bits used to switch downlink sub-bands, uplink sub-bands, or both, wherein the DCI message is associated with the DCI format.

Aspect 8: The method of any of aspects 1 through 7, further comprising: receiving, via the DCI message, a first bit value of a BWP indicator field indicating the second downlink BWP; and receiving, via the DCI message, a second bit value of the BWP indicator field indicating the second uplink BWP, wherein the full-duplex communications are performed within the second downlink BWP and the second uplink BWP based at least in part on the first bit value and the second bit value of the BWP indicator field.

Aspect 9: The method of any of aspects 1 through 8, further comprising: receiving, via the DCI message, a first pair of bit values of a BWP indicator field indicating the second downlink BWP; and receiving, via the DCI message, a second pair of bit values of the BWP indicator field indicating the second uplink BWP, wherein the full-duplex communications are performed within the second downlink BWP and the second uplink BWP based at least in part on the first pair of bit values and the second pair of bit values of the BWP indicator field.

Aspect 10: The method of any of aspects 1 through 9, further comprising: receiving, via the DCI message, one or more bit values of a BWP indicator field indicating a downlink and uplink BWP pair or set identifier associated with the second downlink BWP and the second uplink BWP.

Aspect 11: The method of aspect 10, further comprising: receiving, from the network entity via the control signaling, additional control signaling, or both, an indication of a plurality of downlink and uplink BWP pair or set identifiers, wherein each downlink and uplink BWP pair or set identifier is associated with a respective downlink BWP and a respective uplink BWP, wherein the plurality of downlink and uplink BWP pair or set identifiers include the downlink and uplink BWP pair or set identifier, and wherein receiving the DCI message is based at least in part on receiving the indication of the plurality of downlink and uplink BWP pair or set identifiers.

Aspect 12: The method of any of aspects 10 through 11, further comprising: receiving, from the network node, a RRC message indicating a DCI format comprising one or more bits of the BWP indicator field used to switch downlink and uplink BWP pair or set identifiers, wherein the DCI message is associated with the DCI format.

Aspect 13: The method of any of aspects 1 through 12, further comprising: receiving, via the DCI message, a first pair of bit values of a BWP indicator field indicating a first downlink and uplink BWP pair or set identifier associated with the second downlink BWP and the second uplink BWP; and receiving, via the DCI message, a second pair of bit values of the BWP indicator field indicating a second downlink and uplink BWP pair or set identifier associated with half-duplex communications at the UE.

Aspect 14: The method of any of aspects 1 through 13, wherein the DCI message comprises a GC-DCI message.

Aspect 15: The method of any of aspects 1 through 14, wherein the DCI message indicates to switch to the second downlink sub-band and the second uplink sub-band, the method further comprising: receiving, via the DCI message, an indication of respective starting and ending resource block indices associated with each of the second downlink sub-band and the second uplink sub-band, an indication of respective resource block set indices associated with each of the second downlink sub-band and the second uplink sub-band, or both.

Aspect 16: The method of any of aspects 1 through 15, further comprising: determining that one or more bit field values received via the DCI message indicate the second downlink sub-band and the second uplink sub-band based at least in part on the DCI message not scheduling data at the UE, wherein the one or more bit field values comprise an MCS bit field, a TDRA bit field, or both.

Aspect 17: A method for wireless communication at a network entity, comprising: transmitting, to a UE, control signaling indicating a first downlink BWP and a first uplink BWP, or a first downlink sub-band and a first uplink sub-band, or both, for performing SBFD communications, or both; transmitting, to the UE, a DCI message indicating to switch to a second downlink BWP and a second uplink BWP, or to switch to a second downlink sub-band and a second uplink sub-band, or both; and performing full-duplex communications with the UE within the second downlink BWP and the second uplink BWP, or within the second downlink sub-band and the second uplink sub-band, or both.

Aspect 18: The method of aspect 17, further comprising: transmitting, via the DCI message, one or more BWP indicator field values indicating the second downlink BWP or the second uplink BWP; and transmitting, via the DCI message, one or more additional bit field values indicating an other of the second downlink BWP or the second uplink BWP, wherein the full-duplex communications are performed within the second downlink BWP and the second uplink BWP based at least in part on the one or more BWP indicator field values and the one or more additional bit field values.

Aspect 19: The method of aspect 18, further comprising: transmitting one or more additional bit field values via the DCI message, wherein the one or more additional bit field values indicate the other of the second downlink BWP or the second uplink BWP based at least in part on the DCI message not scheduling data at the UE.

Aspect 20: The method of any of aspects 18 through 19, wherein the one or more additional bit field values comprise an MCS bit field, a TDRA bit field, or both.

Aspect 21: The method of any of aspects 17 through 20, further comprising: transmitting one or more bit field values via the DCI message, wherein the one or more bit field values indicate the second downlink BWP and the second uplink BWP based at least in part on the DCI message not scheduling data at the UE.

Aspect 22: The method of any of aspects 17 through 21, further comprising: transmitting, to the UE, a RRC message indicating a DCI format comprising one or more bits used to switch downlink BWPs, downlink sub-bands, uplink BWPs, uplink sub-bands, or any combination thereof, wherein the DCI message is associated with the DCI format.

Aspect 23: The method of any of aspects 17 through 22, further comprising: transmitting, via the DCI message, a first bit value of BWP indicator field indicating the second downlink BWP; and transmitting, via the DCI message, a second bit value of the BWP indicator field indicating the second uplink BWP, wherein the full-duplex communications are performed within the second downlink BWP and the second uplink BWP based at least in part on the first bit value and the second bit value of the BWP indicator field.

Aspect 24: The method of any of aspects 17 through 23, further comprising: transmitting, via the DCI message, a first pair of bit values of a BWP indicator field indicating the second downlink BWP; and transmitting, via the DCI message, a second pair of bit values of the BWP indicator field indicating the second uplink BWP, wherein the full-duplex communications are performed within the second downlink BWP and the second uplink BWP based at least in part on the first pair of bit values and the second pair of bit values of the BWP indicator field.

Aspect 25: The method of any of aspects 17 through 24, further comprising: transmitting, via the DCI message, one or more bit values of a BWP indicator field indicating a downlink and uplink BWP pair or set identifier associated with the second downlink BWP and the second uplink BWP.

Aspect 26: The method of aspect 25, further comprising: transmitting, from the UE via the control signaling, additional control signaling, or both, an indication of a plurality of downlink and uplink BWP pair or set identifiers, wherein each downlink and uplink BWP pair or set identifier is associated with a respective downlink BWP and a respective uplink BWP, wherein the plurality of downlink and uplink BWP pair or set identifiers include the downlink and uplink BWP pair or set identifier, and wherein transmitting the DCI message is based at least in part on transmitting the indication of the plurality of downlink and uplink BWP pair or set identifiers.

Aspect 27: The method of any of aspects 17 through 26, wherein the DCI message comprises a GC-DCI message.

Aspect 28: The method of any of aspects 17 through 27, wherein the DCI message indicates to switch to the second downlink sub-band and the second uplink sub-band, the method further comprising: transmitting, via the DCI message, an indication of respective starting and ending resource block indices associated with each of the second downlink sub-band and the second uplink sub-band, an indication of respective resource block set indices associated with each of the second downlink sub-band and the second uplink sub-band, or both.

Aspect 29: The method of any of aspects 17 through 28, further comprising: transmitting one or more bit field values via the DCI message, wherein the one or more bit field values indicate the second downlink sub-band and the second uplink sub-band based at least in part on the DCI message not scheduling data at the UE, wherein the one or more bit field values comprise an MCS bit field, a TDRA bit field, or both.

Aspect 30: An apparatus comprising a processor; memory coupled with the processor; and instructions stored in the memory and executable by the processor to cause the apparatus to perform a method of any of aspects 1 through 16.

Aspect 31: An apparatus comprising at least one means for performing a method of any of aspects 1 through 16.

Aspect 32: A non-transitory computer-readable medium storing code the code comprising instructions executable by a processor to perform a method of any of aspects 1 through 16.

Aspect 33: An apparatus comprising a processor; memory coupled with the processor; and instructions stored in the memory and executable by the processor to cause the apparatus to perform a method of any of aspects 17 through 29.

Aspect 34: An apparatus comprising at least one means for performing a method of any of aspects 17 through 29.

Aspect 35: A non-transitory computer-readable medium storing code the code comprising instructions executable by a processor to perform a method of any of aspects 17 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:

one or more processors;

memory coupled with the one or more processors; and instructions stored in the memory and executable by the one or more processors to cause the UE to:

receive, from a network node, control signaling indicating a first downlink bandwidth part and a first uplink bandwidth part, or a first downlink sub-band and a first uplink sub-band, or both, for performing sub-band full-duplex communications;

receive, from the network node, a downlink control information message indicating to switch to a second downlink bandwidth part and a second uplink bandwidth part, or to switch to a second downlink sub-band and a second uplink sub-band, or both, wherein the downlink control information message indicates:

one or more bandwidth part indicator field values indicating one of the second downlink bandwidth part or the second uplink bandwidth part; and one or more additional bit field values indicating an other of the second downlink bandwidth part or the second uplink bandwidth part, wherein:

the one or more additional bit field values indicate the other of the second downlink bandwidth part or the second uplink bandwidth part based at least in part on the one or more bandwidth part indicator field values indicating the one of the second downlink bandwidth part or the second uplink bandwidth part, and the one or more additional bit field values indicate the other of the second downlink bandwidth part or the second uplink bandwidth part further based at least in part on whether the downlink control information message schedules data at the UE; and perform full-duplex communications with the network node within the second downlink bandwidth part and the second uplink bandwidth part, or within the second downlink sub-band and the second uplink sub-band, or both based at least in part on the one or more bandwidth part indicator field values and the one or more additional bit field values.

2. The UE of claim 1, wherein the instructions are further executable by the one or more processors to cause the UE to:

determine that the one or more additional bit field values indicate the other of the second downlink bandwidth part or the second uplink bandwidth part based at least in part on the downlink control information message not scheduling the data at the UE.

3. The UE of claim 1, wherein the one or more additional bit field values comprise a modulation and coding scheme bit field.

4. The UE of claim 1, wherein the one or more additional bit field values comprise a time domain resource allocation bit field.

5. The UE of claim 1, wherein the instructions are further executable by the one or more processors to cause the UE to:

receive, from the network node, a radio resource control message indicating a downlink control information format comprising one or more reserved bits used to switch downlink bandwidth parts, uplink bandwidth parts, or both, wherein the downlink control information message is associated with the downlink control information format.

6. The UE of claim 1, wherein the instructions are further executable by the one or more processors to cause the UE to:

receive, from the network node, a radio resource control message indicating a downlink control information format comprising one or more reserved bits used to switch downlink sub-bands, uplink sub-bands, or both, wherein the downlink control information message is associated with the downlink control information format.

7. The UE of claim 1, wherein the instructions are further executable by the one or more processors to cause the UE to:

receive, via the downlink control information message, a first bit value of a bandwidth part indicator field indicating the second downlink bandwidth part; and receive, via the downlink control information message, a second bit value of the bandwidth part indicator field indicating the second uplink bandwidth part, wherein the full-duplex communications are performed within the second downlink bandwidth part and the second uplink bandwidth part based at least in part on the first bit value and the second bit value of the bandwidth part indicator field.

8. The UE of claim 1, wherein the instructions are further executable by the one or more processors to cause the UE to:

receive, via the downlink control information message, a first pair of bit values of a bandwidth part indicator field indicating the second downlink bandwidth part; and receive, via the downlink control information message, a second pair of bit values of the bandwidth part indicator field indicating the second uplink bandwidth part, wherein the full-duplex communications are performed within the second downlink bandwidth part and the second uplink bandwidth part based at least in part on the first pair of bit values and the second pair of bit values of the bandwidth part indicator field.

9. The UE of claim 1, wherein the instructions are further executable by the one or more processors to cause the UE to:

receive, via the downlink control information message, one or more bit values of a bandwidth part indicator field indicating a downlink and uplink bandwidth part pair or set identifier associated with the second downlink bandwidth part and the second uplink bandwidth part.

10. The UE of claim 9, wherein the instructions are further executable by the one or more processors to cause the UE to:

receive, from the network node via the control signaling, additional control signaling, or both, an indication of a plurality of downlink and uplink bandwidth part pair or set identifiers, wherein each downlink and uplink bandwidth part pair or set identifier is associated with a respective downlink bandwidth part and a respective uplink bandwidth part, wherein the plurality of downlink and uplink bandwidth part pair or set identifiers include the downlink and uplink bandwidth part pair or set identifier, and wherein receiving the downlink control information message is based at least in part on receiving the indication of the plurality of downlink and uplink bandwidth part pair or set identifiers.

11. The UE of claim 9, wherein the instructions are further executable by the one or more processors to cause the UE to:

receive, from the network node, a radio resource control message indicating a downlink control information format comprising one or more bits of the bandwidth part indicator field used to switch downlink and uplink bandwidth part pair or set identifiers, wherein the downlink control information message is associated with the downlink control information format.

12. The UE of claim 1, wherein the instructions are further executable by the one or more processors to cause the UE to:

receive, via the downlink control information message, a first pair of bit values of a bandwidth part indicator field indicating a first downlink and uplink bandwidth part pair or set identifier associated with the second downlink bandwidth part and the second uplink bandwidth part; and receive, via the downlink control information message, a second pair of bit values of the bandwidth part indicator field indicating a second downlink and uplink bandwidth part pair or set identifier associated with half-duplex communications at the UE.

13. The UE of claim 1, wherein the downlink control information message comprises a group-common downlink control information message.

14. The UE of claim 1, wherein the downlink control information message indicates to switch to the second downlink sub-band and the second uplink sub-band, wherein the instructions are further executable by the one or more processors to cause the UE to:

receive, via the downlink control information message, an indication of respective starting and ending resource block indices associated with each of the second downlink sub-band and the second uplink sub-band, an indication of respective resource block set indices associated with each of the second downlink sub-band and the second uplink sub-band, or both.

15. The UE of claim 1, wherein the instructions are further executable by the one or more processors to cause the UE to:

determine that one or more bit field values received via the downlink control information message indicate the second downlink sub-band and the second uplink sub-band based at least in part on the downlink control information message not scheduling data at the UE, wherein the one or more bit field values comprise a modulation and coding scheme bit field, a time domain resource allocation bit field, or both.

16. A network node for wireless communications, comprising:

one or more processors;

memory coupled with the one or more processors; and instructions stored in the memory and executable by the one or more processors to cause the network node to:

transmit, to a user equipment (UE), control signaling indicating a first downlink bandwidth part and a first uplink bandwidth part, or a first downlink sub-band and a first uplink sub-band, or both, for performing sub-band full-duplex communications, or both;

transmit, to the UE, a downlink control information message indicating to switch to a second downlink bandwidth part and a second uplink bandwidth part, or to switch to a second downlink sub-band and a second uplink sub-band, or both, wherein the downlink control information message indicates:

one or more bandwidth part indicator field values indicating one of the second downlink bandwidth part or the second uplink bandwidth part; and one or more additional bit field values indicating an other of the second downlink bandwidth part or the second uplink bandwidth part, wherein:

the one or more additional bit field values indicate the other of the second downlink bandwidth part or the second uplink bandwidth part based at least in part on the one or more bandwidth part indicator field values indicating the one of the second downlink bandwidth part or the second uplink bandwidth part, and the one or more additional bit field values indicate the other of the second downlink bandwidth part or the second uplink bandwidth part further based at least in part on whether the downlink control information message schedules data at the UE; and perform full-duplex communications with the UE within the second downlink bandwidth part and the second uplink bandwidth part, or within the second downlink sub-band and the second uplink sub-band, or both.

17. The network node of claim 16, wherein the one or more additional bit field values indicate the other of the second downlink bandwidth part or the second uplink bandwidth part based at least in part on the downlink control information message not scheduling the data at the UE.

18. The network node of claim 16, wherein the one or more additional bit field values comprise a modulation and coding scheme bit field.

19. The network node of claim 16, wherein the one or more additional bit field values comprise a time domain resource allocation bit field.

20. The network node of claim 16, wherein the downlink control information message indicates to switch to the second downlink sub-band and the second uplink sub-band, wherein the instructions are further executable by the one or more processors to cause the network node to:

transmit, to the UE, a radio resource control message indicating a downlink control information format comprising one or more bits used to switch downlink bandwidth parts, downlink sub-bands, uplink bandwidth parts, uplink sub-bands, or any combination thereof, wherein the downlink control information message is associated with the downlink control information format.

21. The network node of claim 16, wherein the instructions are further executable by the one or more processors to cause the network node to:

transmit, via the downlink control information message, a first bit value of bandwidth part indicator field indicating the second downlink bandwidth part; and transmit, via the downlink control information message, a second bit value of the bandwidth part indicator field indicating the second uplink bandwidth part, wherein the full-duplex communications are performed within the second downlink bandwidth part and the second uplink bandwidth part based at least in part on the first bit value and the second bit value of the bandwidth part indicator field.

22. The network node of claim 16, wherein the instructions are further executable by the one or more processors to cause the network node to:

transmit, via the downlink control information message, a first pair of bit values of a bandwidth part indicator field indicating the second downlink bandwidth part; and transmit, via the downlink control information message, a second pair of bit values of the bandwidth part indicator field indicating the second uplink bandwidth part, wherein the full-duplex communications are performed within the second downlink bandwidth part and the second uplink bandwidth part based at least in part on the first pair of bit values and the second pair of bit values of the bandwidth part indicator field.

23. The network node of claim 16, wherein the instructions are further executable by the one or more processors to cause the network node to:

transmit, via the downlink control information message, one or more bit values of a bandwidth part indicator field indicating a downlink and uplink bandwidth part pair or set identifier associated with the second downlink bandwidth part and the second uplink bandwidth part.

24. The network node of claim 23, wherein the instructions are further executable by the one or more processors to cause the network node to:

transmit, to the UE via the control signaling, additional control signaling, or both, an indication of a plurality of downlink and uplink bandwidth part pair or set identifiers, wherein each downlink and uplink bandwidth part pair or set identifier is associated with a respective downlink bandwidth part and a respective uplink bandwidth part, wherein the plurality of downlink and uplink bandwidth part pair or set identifiers include the downlink and uplink bandwidth part pair or set identifier, and wherein transmitting the downlink control information message is based at least in part on transmitting the indication of the plurality of downlink and uplink bandwidth part pair or set identifiers.

25. A method for wireless communication at a user equipment (UE), comprising:

receiving, from a network node, control signaling indicating a first downlink bandwidth part and a first uplink bandwidth part, or a first downlink sub-band and a first uplink sub-band, or both, for performing sub-band full-duplex communications;

receiving, from the network node, a downlink control information message indicating to switch to a second downlink bandwidth part and a second uplink bandwidth part, or to switch to a second downlink sub-band and a second uplink sub-band, or both, wherein the downlink control information message indicates:

one or more bandwidth part indicator field values indicating one of the second downlink bandwidth part or the second uplink bandwidth part; and one or more additional bit field values indicating an other of the second downlink bandwidth part or the second uplink bandwidth part, wherein:

the one or more additional bit field values indicate the other of the second downlink bandwidth part or the second uplink bandwidth part based at least in part on the one or more bandwidth part indicator field values indicating the one of the second downlink bandwidth part or the second uplink bandwidth part, and the one or more additional bit field values indicate the other of the second downlink bandwidth part or the second uplink bandwidth part further based at least in part on whether the downlink control information message schedules data at the UE; and performing full-duplex communications with the network node within the second downlink bandwidth part and the second uplink bandwidth part, or within the second downlink sub-band and the second uplink sub-band, or both.

26. A method for wireless communication at a network node, comprising:

transmitting, to a user equipment (UE), control signaling indicating a first downlink bandwidth part and a first uplink bandwidth part, or a first downlink sub-band and a first uplink sub-band, or both, for performing sub-band full-duplex communications, or both;

transmitting, to the UE, a downlink control information message indicating to switch to a second downlink bandwidth part and a second uplink bandwidth part, or to switch to a second downlink sub-band and a second uplink sub-band, or both, wherein the downlink control information message indicates:

one or more bandwidth part indicator field values indicating one of the second downlink bandwidth part or the second uplink bandwidth part; and one or more additional bit field values indicating an other of the second downlink bandwidth part or the second uplink bandwidth part, wherein:

the one or more additional bit field values indicate the other of the second downlink bandwidth part or the second uplink bandwidth part based at least in part on the one or more bandwidth part indicator field values indicating the one of the second downlink bandwidth part or the second uplink bandwidth part, and the one or more additional bit field values indicate the other of the second downlink bandwidth part or the second uplink bandwidth part further based at least in part on whether the downlink control information message schedules data at the UE; and performing full-duplex communications with the UE within the second downlink bandwidth part and the second uplink bandwidth part, or within the second downlink sub-band and the second uplink sub-band, or both.

* * * * *